(12) United States Patent
Gotou et al.

(10) Patent No.: US 6,586,902 B2
(45) Date of Patent: Jul. 1, 2003

(54) DISK DRIVE APPARATUS AND MOTOR

(75) Inventors: Makoto Gotou, Nishinomiya (JP); Hideaki Mori, Moriguchi (JP); Masaaki Ochi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/912,569

(22) Filed: Jul. 25, 2001

(65) Prior Publication Data

US 2002/0017887 A1 Feb. 14, 2002

(30) Foreign Application Priority Data

Jul. 26, 2000 (JP) ........................................ 2000-225035

(51) Int. Cl.[7] .............................................. G05B 11/01
(52) U.S. Cl. ...................... 318/560; 318/138; 318/139; 318/254; 318/439; 318/599; 318/811
(58) Field of Search ................................ 318/138, 139, 318/254, 439, 599, 811, 560

(56) References Cited

U.S. PATENT DOCUMENTS

| | | | |
|---|---|---|---|
| 4,309,643 A | * 1/1982 | Akamatsu | ................... 318/138 |
| 4,900,993 A | * 2/1990 | Yasohara et al. | ........... 318/254 |
| RE34,399 E | * 10/1993 | Gami et al. | ............... 360/73.01 |
| 5,473,232 A | 12/1995 | Tamaki et al. | |
| 5,523,660 A | * 6/1996 | Fujii | ........................... 318/254 |
| 5,530,326 A | * 6/1996 | Galvin et al. | ................ 318/254 |
| 5,793,183 A | 8/1998 | Carobolante et al. | |
| 5,847,521 A | * 12/1998 | Morikawa et al. | ........... 318/254 |
| 5,886,486 A | * 3/1999 | Jeong et al. | ................. 318/254 |
| 5,982,118 A | 11/1999 | Gotou et al. | |
| 5,982,133 A | * 11/1999 | Murakami et al. | .......... 318/650 |
| 6,204,621 B1 | * 3/2001 | Gotou | ......................... 318/599 |
| 6,242,875 B1 | * 6/2001 | Kusaka et al. | .............. 318/254 |
| 6,316,894 B2 | * 11/2001 | Hashimura | ................... 318/439 |
| 6,404,153 B2 | * 6/2002 | Gotou | ......................... 318/254 |
| 6,424,106 B2 | * 7/2002 | Gotou et al. | ................. 318/254 |

\* cited by examiner

*Primary Examiner*—Robert E. Nappi
*Assistant Examiner*—Tyrone Smith
(74) *Attorney, Agent, or Firm*—Akin, Gump, Strauss, Hauer & Feld, L.L.P.

(57) ABSTRACT

A disk drive apparatus reproduces an information signal from a disk and/or records an information signal on the disk. FET power transistors of a power supplying part execute high-frequency switching operation and form current paths to three-phase windings so as to rotate the disk. A voltage detecting part compares terminal voltages of the three-phase windings and produces a detected pulse signal in response to a comparison result. An activation operation block controls active periods of the FET power transistors in response to the detected pulse signal. A commanding part produces a command signal in response to an output pulse signal of the voltage detecting part. A switching operation block produces a switching pulse signal in response to a comparison result of a current-detection signal with the command signal, and causes at least an FET power transistor of the power supplying part to perform high-frequency switching in response to the switching pulse signal. The switching operation block changes a timing of the switching pulse signal in response to detection of the detected pulse signal so that the voltage detecting part can accurately achieve the next detection of the detected pulse signal. Further, an excellent speed control of the disk can be achieved by the accurate output pulse signal of the voltage detecting part.

36 Claims, 23 Drawing Sheets

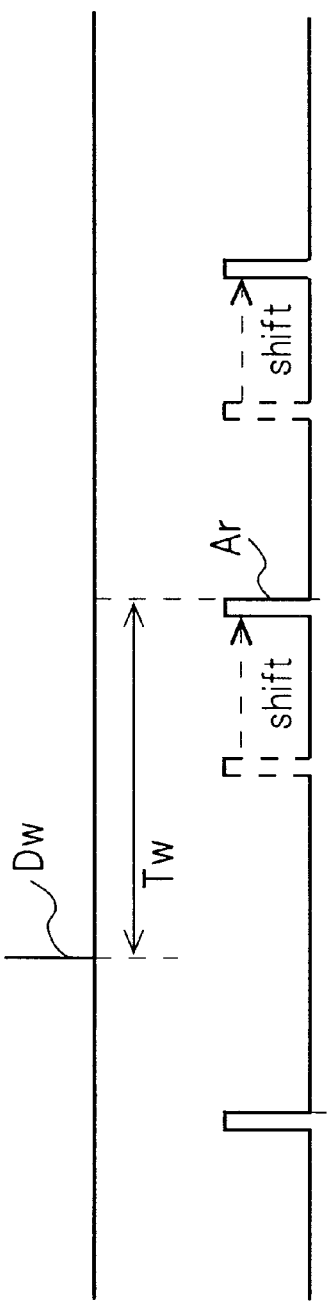
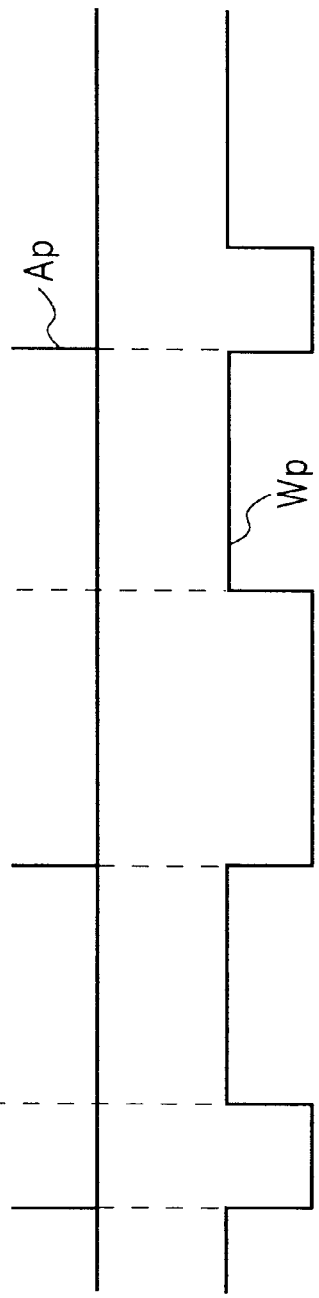
FIG.17 (a)
FIG.17 (b)
FIG.17 (c)
FIG.17 (d)

DISK DRIVE APPARATUS AND MOTOR

BACKGROUND OF THE INVENTION

The present invention relates to a disk drive apparatus and a motor.

In recent years, a motor which alters current paths to plural-phase windings electronically with plural transistors has been used widely as a drive motor for an office automation apparatus and an audio-visual apparatus. A disk drive apparatuses, such as an optical disk drive apparatus (DVD drive apparatus, CD drive apparatus, for example) and a magnetic disk drive apparatus (HDD drive apparatus, FDD drive apparatus, for example), includes such a motor.

FIG. 23 shows a conventional motor which alters current paths to windings with PNP power transistors and NPN power transistors, and its operation will be described below. A rotor 2011 has a field part formed by a permanent magnet. Three position detecting elements of a position detector 2041 detect the magnetic field of the field part of the rotor 2011. In other words, the position detector 2041 generates two sets of voltage signals, Kp1, Kp2 and Kp3, and, Kp4, Kp5 and Kp6, from the three-phase output signals of the three position detecting elements in response to the rotation of the rotor 2011. A first distributor 2042 generates three-phase low-side signals Lp1, Lp2 and Lp3 responding with the voltage signals Kp1, Kp2 and Kp3 to control the activation of the low-side NPN power transistors 2021, 2022 and 2023. A second distributor 2043 generates three-phase high-side signals Mp1, Mp2 and Mp3 responding with the voltage signals Kp4, Kp5 and Kp6 to control the activation of the high-side PNP power transistors 2025, 2026 and 2027. As a result, three-phase drive voltages are supplied to windings 2012, 2013 and 2014.

Though the conventional motor may be used in a disk drive apparatus, it has a disadvantage of large power losses of the power transistors. The NPN power transistors 2021, 2022 and 2023 and the PNP power transistors 2025, 2026 and 2027 supply drive voltages to the windings 2012, 2013 and 2014 by controlling the voltage drop across the emitter and the collector of each bipolar power transistor in an analogue manner. Since the voltage drop in each bipolar power transistor is large, each power transistor produces a large power loss by the product value of the voltage drop and the drive current to the winding. The power loss makes a large heat generation.

U.S. Pat. No. 5,982,118 discloses a motor which reduces the power losses of the power transistors by supplying PWM drive voltages to windings responding with output signals of two position detecting elements. However, the conventional motor such as one in FIG. 23 or one in U.S. Pat. No. 5,982,118 includes three or two position detecting elements for detecting the rotational position of the rotor. For this reason, the spaces, connecting wires, etc. of the position detecting elements are required, which makes the motor complicated and expensive.

U.S. Pat. No. 5,473,232 discloses a motor which detects terminal voltages of the windings and alters current paths to the windings in response to the timing of the detection. However, the speed fluctuation of the motor of U.S. Pat. No. 5,473,232 may be large, because it detects only one terminal voltage of the windings.

In a disk drive apparatus such as a HDD drive apparatus or a DVD drive apparatus, a motor with reduced speed fluctuation (jitter) as well as reduced heat generation has been demanded so as to achieve a good reproduction and/or a good recording on a high-density disk. Since a large jitter of the rotational speed of the disk causes frequent bit errors in a reproduced digital signal, the disk drive apparatus is required to reduce the jitter of the rotational disk speed. Furthermore, the large jitter of the rotational speed of the disk causes positional displacements of the recording signal on the disk in recording a signal.

It is therefore an object of the present invention to provide a disk drive apparatus and a motor capable of solving one or all of the above-mentioned problems.

BRIEF SUMMARY OF THE INVENTION

The disk drive apparatus in accordance with the main aspect of the present invention comprises:

head means for at least reproducing a signal from a disk or recording a signal on said disk;

processing means for at least processing an output signal from said head means and outputting a reproduced signal, or processing a signal and outputting a recording signal into said head means;

a rotor for driving said disk, provided with a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal responding with terminal voltages of said Q-phase windings;

activation operation means for controlling active periods of said Q first power transistors and said Q second power transistors responding with said detected pulse signal of said voltage detecting means, each of said active periods being an electrical angle which is larger than 360/Q degrees;

commanding means for producing a command signal corresponding to a rotational speed of said disk; and switching operation means for producing a switching pulse signal corresponding to said command signal, causing at least one power transistor among said Q first power transistors and said Q second power transistors to perform high-frequency switching responding with said switching pulse signal, and changing a timing of said switching pulse signal responding with detection of said detected pulse signal from said voltage detecting means.

With this configuration, the switching operation means causes at least one of the power transistors of the power supplying means to perform high-frequency switching operation. Therefore, the power losses and heat generation of the power transistors of the power supplying means can be reduced significantly. Furthermore, the voltage detecting means and the activation operation means control the alteration of current paths to the windings responding with the detected pulse signal which is obtained by detecting the terminal voltages of the windings, thereby rotating the disk in a predetermined direction. Hence, no position detecting element is required, and thus the configuration of the disk drive apparatus is simplified. Furthermore, the switching operation means changes the timing of the high-frequency switching operation of the power transistors responding with the occurrence of the detected pulse signal of the voltage detecting means. This prevents the switching operation of the power transistors from occurring near a point of time when it is expected that the voltage detecting means obtains the next generation of the detected pulse signal responding with the terminal voltages of the windings. Therefore, the voltage detecting means can accurately detect the terminal voltages of the windings and produce an accurate and precise detected pulse signal without an influence of the switching noises by the high-frequency switching operation of the power transistors. As a result, the disk drive apparatus can alter current paths to the windings accurately responding with the detected pulse signal of the voltage detecting means, thereby rotating the disk stably. Moreover, the disk drive apparatus can achieve an accurate speed control with reduced jitter without providing a speed detector by controlling the disk speed responding with the detected signal, for example. In other words, the disk drive apparatus can achieve stable and precise disk rotation without a position detecting element and a speed detecting element, thereby reducing significantly the number of elements for rotating the disk. Still further, since the disk drive apparatus reduces not only the power consumption for rotating the disk but also the heat generation significantly, it can stably reproduce and/or record a signal from/on a recordable disk which is susceptible to heat. Hence, a high-performance disk drive apparatus with reduced power consumption and reduced jitter can be realized inexpensively, which is suitable to reproduce and/or record a signal on a high-density disk.

The disk drive apparatus in accordance with another aspect of the present invention comprises:

head means for at least reproducing a signal from a disk or recording a signal on said disk;

processing means for at least processing an output signal from said head means and outputting a reproduced signal, or processing a signal and outputting a recording signal into said head means;

a rotor for driving said disk, provided with a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal responding with terminal voltages of said Q-phase windings;

activation operation means for controlling active periods of said Q first power transistors and said Q second power transistors responding with said detected pulse signal of said voltage detecting means, each of said active periods being an electrical angle which is larger than 360/Q degrees;

commanding means for producing a command signal corresponding to a rotational speed of said disk; and switching operation means including:

current detecting means for producing a current-detection signal responding with or corresponding to a composed supply current from said voltage supplying means to said Q-phase windings, and switching control means for producing a switching pulse signal responding with said current-detection signal and said command signal, causing at least one power transistor among said Q first power transistors and said Q second power transistors to perform high-frequency switching responding with said switching pulse signal, and changing a timing of said switching pulse signal responding with detection of said detected pulse signal.

With this configuration, the switching operation means causes at least one of the power transistors of the power supplying means to perform high-frequency switching operation. Therefore, the power losses and heat generation of the power transistors of the power supplying means can be reduced significantly. Furthermore, the voltage detecting means and the activation operation means control the alteration of current paths to the windings responding with the detected pulse signal which is obtained by detecting the terminal voltages of the windings, thereby rotating the disk in a predetermined direction. Hence, no position detecting element is required, and thus the configuration of the disk drive apparatus is simplified. Furthermore, a composed supply current to the Q-phase windings from the voltage supplying means is detected, and the switching control means produces a switching pulse signal responding with the current-detection signal and the command signal so as to cause a power transistor to perform high-frequency switching responding with the switching pulse signal. Hence, the drive current signals to the Q-phase windings are precisely controlled responding with the command signal. As a result, the pulsation of the generated drive force can be reduced remarkably, thereby reducing disk vibration and acoustic noise of the disk drive apparatus. Furthermore, the switching operation means changes the timing of the high-frequency switching operation of the power transistors responding with the occurrence of the detected pulse signal of the voltage detecting means. This prevents the switching operation of the power transistors from occurring near a point of time when it is expected that the voltage detecting means obtains the next generation of the detected pulse signal responding with the terminal voltages of the windings. Therefore, the voltage detecting means can accurately detect the terminal voltages of the windings and produce an accurate and precise detected pulse signal without an influence of the switching noises by the high-frequency switching operation of the power transistors. As a result, the disk drive apparatus can alter current paths to the windings accurately responding with the detected pulse signal of the voltage detecting means, thereby rotating the disk stably. Moreover, the disk drive apparatus can achieve an accurate speed control with reduced jitter without providing a speed detector by controlling the disk speed responding with the detected signal, for example. In other words, the disk drive apparatus can achieve stable and precise disk rotation without a position detecting element and a speed detecting element, thereby reducing significantly the number of elements for rotating the disk. Still further, since the disk drive apparatus reduces not only the power consumption for rotating the disk but also the heat generation significantly, it can stably reproduce and/or record a signal from/on a recordable disk which is susceptible to heat. Hence, a high-performance disk drive apparatus with reduced power consumption and reduced jitter can be realized inexpensively, which is suitable to reproduce and/or record a signal on a high-density disk.

The disk drive apparatus in accordance with another aspect of the present invention comprises:

head means and processing means for at least reproducing a signal from a disk or recording a signal on said disk; power transistors for forming current paths to plural-phase windings so as to rotate said disk; voltage detecting means and activation operation means for producing a detected pulse signal responding with terminal voltages of said plural-phase windings and controlling active periods of said power transistors responding with said detected pulse signal; and switching operation means for producing a switching pulse signal corresponding to a command signal, causing at least one power transistor of said power transistors to perform high-frequency switching responding with said switching pulse signal, and changing a timing of said switching pulse signal responding with detection of said detected pulse signal.

With this configuration, the switching operation means causes at least one of the power transistors to perform high-frequency switching operation. Therefore, the power losses and heat generation of the power transistors can be reduced significantly. Furthermore, the voltage detecting means and the activation operation means control the alteration of current paths to the windings responding with the detected pulse signal which is obtained by detecting the terminal voltages of the windings, thereby rotating the disk in a predetermined direction. Hence, no position detecting element is required, and thus the configuration of the disk drive apparatus is simplified. Furthermore, the switching operation means changes the timing of the high-frequency switching operation of the power transistors responding with the occurrence of the detected pulse signal of the voltage detecting means. This prevents the switching operation of the power transistors from occurring near a point of time when it is expected that the voltage detecting means obtains the next detection of the detected pulse signal responding with the terminal voltages of the windings. Therefore, the voltage detecting means can accurately detect the terminal voltages of the windings and produce an accurate and precise detected pulse signal without an influence of the switching noises by the high-frequency switching operation of the power transistors. As a result, the disk drive apparatus can alter current paths to the windings accurately responding with the detected pulse signal of the voltage detecting means, thereby rotating the disk stably. Moreover, the disk drive apparatus can achieve an accurate speed control with reduced jitter without providing a speed detector by controlling the disk speed responding with the detected signal, for example. In other words, the disk drive apparatus can achieve stable and precise disk rotation without a position detecting element and a speed detecting element, thereby reducing significantly the number of elements for rotating the disk. Still further, since the disk drive apparatus reduces not only the power consumption for rotating the disk but also the heat generation significantly, it can stably reproduce and/or record a signal from/on a recordable disk which is susceptible to heat. Hence, a high-performance disk drive apparatus with reduced power consumption and reduced jitter can be realized inexpensively, which is suitable to reproduce and/or record a signal on a high-density disk.

The motor in accordance with the main aspect of the present invention comprises:

a rotor provided with a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal responding with terminal voltages of said Q-phase windings;

activation operation means for controlling active periods of said Q first power transistors and said Q second power transistors responding with said detected pulse signal of said voltage detecting means, each of said active periods being an electrical angle which is larger than 360/Q degrees;

commanding means for producing a command signal corresponding to a rotational speed of said rotor; and switching operation means for producing a switching pulse signal corresponding to said command signal, causing at least one power transistor among said Q first power transistors and said Q second power transistors to perform high-frequency switching responding with said switching pulse signal, and changing a timing of said switching pulse signal responding with detection of said detected pulse signal from said voltage detecting means.

With this configuration, the switching operation means causes at least one of the power transistors of the power supplying means to perform high-frequency switching operation. Therefore, the power losses and heat generation of the power transistors of the power supplying means can be reduced significantly. Furthermore, the voltage detecting means and the activation operation means control the alteration of current paths to the windings responding with the detected pulse signal which is obtained by detecting the terminal voltages of the windings, thereby rotating the rotor in a predetermined direction. Hence, no position detecting element is required, and thus the configuration of the motor is simplified. Furthermore, the switching operation means changes the timing of the high-frequency switching operation of the power transistors responding with the occurrence of the detected pulse signal of the voltage detecting means. This prevents the switching operation of the power transistors from occurring near a point of time when it is expected that the voltage detecting means obtains the next detection of the detected pulse signal responding with the terminal voltages of the windings. Therefore, the voltage detecting means can accurately detect the terminal voltages of the windings and produce an accurate and precise detected pulse signal without an influence of the switching noises by the high-frequency switching operation of the power transistors. As a result, the motor can alter current paths to the windings accurately responding with the detected pulse signal of the voltage detecting means, thereby rotating the rotor stably. Moreover, the motor can achieve an accurate speed control with reduced jitter without providing a speed detector by controlling the rotor speed responding with the detected signal, for example. In other words, the motor can achieve stable and precise rotation without a position detecting element and a speed detecting element, thereby reducing significantly the number of elements for rotating the rotor. Hence, a high-performance motor with reduced power consumption and reduced speed fluctuation can be realized inexpensively.

The motor in accordance with another aspect of the present invention comprises:

a rotor provided with a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means-for producing a detected pulse signal responding with terminal voltages of said Q-phase windings;

activation operation means for controlling active periods of said Q first power transistors and said Q second power transistors responding with said detected pulse signal of said voltage detecting means, each of said active periods being an electrical angle which is larger than 360/Q degrees;

commanding means for producing a command signal corresponding to a rotational speed of said rotor; and switching operation means including:
  current detecting means for producing a current-detection signal responding with or corresponding to a composed supply current from said voltage supplying means to said Q-phase windings, and
  switching control means for producing a switching pulse signal responding with said current-detection signal and said command signal, causing at least one power transistor among said Q first power transistors and said Q second power transistors to perform high-frequency switching responding with said switching pulse signal, and changing a timing of said switching pulse signal responding with detection of said detected pulse signal.

With this configuration, the switching operation means causes at least one of the power transistors of the power supplying means to perform high-frequency switching operation. Therefore, the power losses and heat generation of the power transistors of the power supplying means can be reduced significantly. Furthermore, the voltage detecting means and the activation operation means control the alteration of current paths to the windings responding with the detected pulse signal which is obtained by detecting the terminal voltages of the windings, thereby rotating the rotor in a predetermined direction. Hence, no position detecting element is required, and thus the configuration of the motor is simplified. Furthermore, a composed supply current to the Q-phase windings from the voltage supplying means is detected, and the switching control means produces a switching pulse signal responding with the current-detection signal and the command signal so as to cause a power transistor to perform high-frequency switching responding with the switching pulse signal. Hence, the drive current signals to the Q-phase windings are precisely controlled responding with the command signal. As a result, the pulsation of the generated drive force can be reduced remarkably, thereby reducing rotor vibration of the motor. Furthermore, the switching operation means changes the timing of the high-frequency switching operation of the power transistors responding with the occurrence of the detected pulse signal of the voltage detecting means. This prevents the switching operation of the power transistors from occurring near a point of time when it is expected that the voltage detecting means obtains the next detection of the detected pulse signal responding with the terminal voltages of the windings. Therefore, the voltage detecting means can accurately detect the terminal voltages of the windings and produce an accurate and precise detected pulse signal without an influence of the switching noises by the high-frequency switching operation of the power transistors. As a result, the motor can alter current paths to the windings accurately responding with the detected pulse signal of the voltage detecting means, thereby rotating the rotor stably. Moreover, the motor can achieve an accurate speed control with reduced jitter without providing a speed detecting element by controlling the rotor speed responding with the detected signal, for example. In other words, the motor can achieve stable and precise rotation without a position detecting element and a speed detecting element, thereby reducing significantly the number of elements for rotating the rotor. Hence, a high-performance motor with reduced power consumption and reduced speed fluctuation can be realized inexpensively.

The motor in accordance with another aspect of the present invention comprises:

power transistors for forming current paths to plural-phase windings so as to rotate a rotor; voltage detecting means and activation operation means for producing a detected pulse signal responding with terminal voltages of said plural-phase windings and controlling active periods of said power transistors responding with said detected pulse signal; and switching operation means for producing a switching pulse signal corresponding to a command signal, causing at least one power transistor of said power transistors to perform high-frequency switching responding with said switching pulse signal, and changing a timing of said switching pulse signal responding with detection of said detected pulse signal.

With this configuration, the switching operation means causes at least one of the power transistors to perform high-frequency switching operation. Therefore, the power losses and heat generation of the power transistors can be reduced significantly. Furthermore, the voltage detecting means and the activation operation means control the alteration of current paths to the windings responding with the detected pulse signal which is obtained by detecting the terminal voltages of the windings, thereby rotating the rotor in a predetermined direction. Hence, no position detecting element is required, and thus the configuration of the motor is simplified. Furthermore, the switching operation means changes the timing of the high-frequency switching operation of the power transistors responding with the occurrence of the detected pulse signal of the voltage detecting means. This prevents the switching operation of the power transistors from occurring near a point of time when it is expected that the voltage detecting means obtains the next detection of the detected pulse signal responding with the terminal voltages of the windings. Therefore, the voltage detecting means can accurately detect the terminal voltages of the windings and produce an accurate and precise detected pulse signal without an influence of the switching noises by the high-frequency switching operation of the power transistors. As a result, the motor can alter current paths to the windings accurately responding with the detected pulse signal of the voltage detecting means, thereby rotating the rotor stably. Moreover, the motor can achieve an accurate speed control with reduced jitter without providing a speed detector by controlling the rotor speed responding with the detected signal, for example. In other words, the motor can achieve stable and precise rotation without a position detecting element and a speed detecting element, thereby reducing significantly the number of elements for rotating the rotor. Hence, a high-performance motor with reduced power consumption and reduced speed fluctuation can be realized inexpensively.

These and other configurations and operations will be described in detail in the explanations of embodiments of the present invention.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

FIG. 17 is another waveform diagram illustrating the operation of the switching control part 22 in accordance with the embodiment 1;

It will be recognized that some or all of the Figures are schematic representations for purposes of illustration and do not necessarily depict the actual relative sizes or locations of the elements shown.

DETAILED DESCRIPTION OF THE INVENTION

Preferable embodiments of the present invention will be described below referring to the accompanying drawings.

<<Embodiment 1>>

Figure 1:
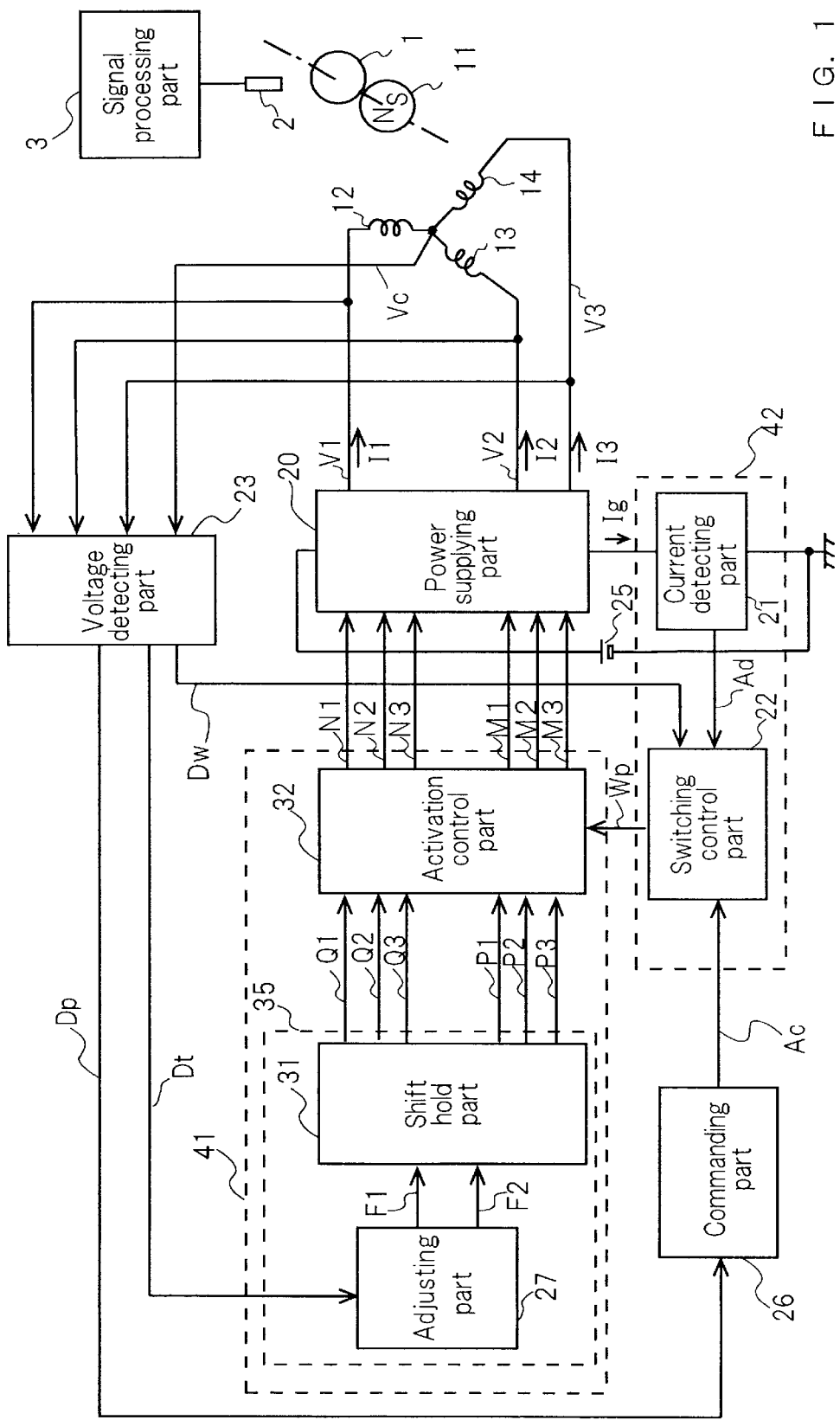
FIG. 1 is a diagram showing a comprehensive configuration in accordance with embodiment 1 of the present invention.

FIGS. 1 to 11 show a motor and a disk drive apparatus including the motor in accordance with embodiment 1 of the present invention. FIG. 1 shows a comprehensive configuration of the disk drive apparatus. A rotor 11 includes a field part which has at least one pair of N and S poles for generating field fluxes. Although a field part formed by a two-pole permanent magnet is herein shown, it is generally possible to form a multi-pole field part with a multi-pole magnet or with many magnetic pole pieces. Three-phase windings 12, 13 and 14 are disposed on a stator, each displaced from the others by an electrical angle of 120 degrees, where an electrical angle of 360 degrees corresponds to an angle width of one pair of the N and S poles in the field part of the rotor 11. The one end of each of the three-phase windings 12, 13 and 14 is commonly connected, and the other end thereof is used as a power supply terminal and connected to each output terminal of a power supplying part 20. The three-phase windings 12, 13 and 14 generate three-phase magnetic fluxes by three-phase drive current signals I1, I2 and I3, and a drive force by the interaction between the field part of the rotor 11 and the drive current signals is generated, thereby supplying the generated force to the rotor 11. A disk 1 is fixed to the rotor 11 and directly rotated with the rotor 11.

When the disk 1 is already recorded with digital signals (such as high-quality audio and video signals, for example), a head part 2 comprising an optical head part or a magnetic head part reproduces the signals from the disk 1. A signal processing part 3 processes output signals from the head part 2 and outputs reproduced signals.

Alternatively, when the disk 1 is a recordable disk, the head part 2 comprising an optical head part or a magnetic head part records digital signals on the disk 1. The signal processing part 3 processes input recording signals (such as high-quality audio and video signals, for example) and supplies the digital signals for recording to the head part 2.

Figure 11:
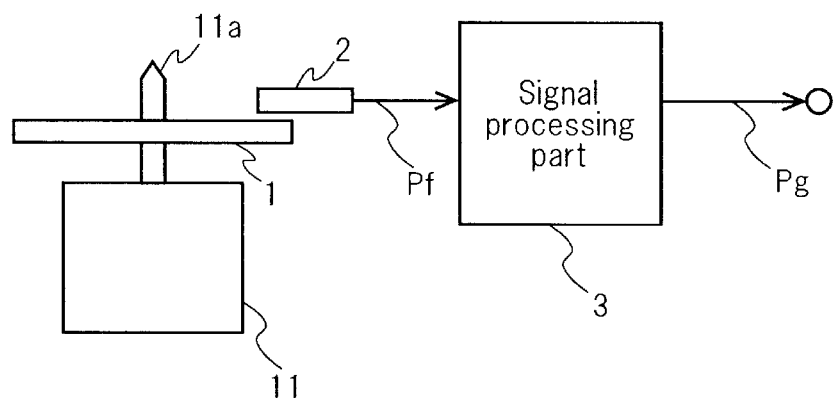
FIG. 11 is a block diagram relating to signals of a disk drive apparatus in accordance with the embodiment 1.
Figure 11:
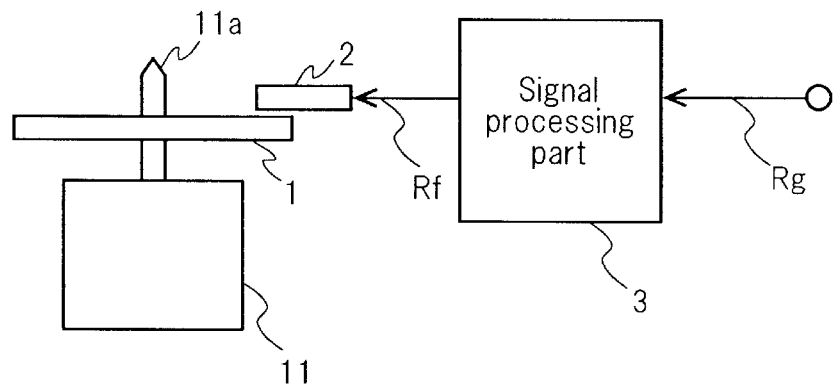

The part (a) of FIG. 11 shows an example of a disk drive apparatus for reproducing a signal from a disk. The disk 1 is directly fixed to the rotational shaft 11a of the rotor 11 and is rotated with the rotor 11. The disk 1 has digital signals recorded on it at a high density. The head part 2 reproduces the digital signals from the disk 1 and outputs a head signal Pf for reproduction. The signal processing part 3 digitally processes the head signal Pf from the head part 2 and outputs a reproduced signal Pg. In the part (a) of FIG. 11, the stator and the windings are abbreviated.

The part (b) of FIG. 11 shows an example of a disk drive apparatus for recording a signal on a disk. The disk 1 is directly fixed to the rotational shaft 11a of the rotor 11 and is rotated with the rotor 11. The disk 1 is a recordable disk and can be recorded digital signals at a high density. The signal processing part 3 digitally processes an input recording signal Rg and outputs a head signal Rf to the head part 2. The head part 2 records the head signal Rf on the recordable disk 1, thereby forming a new signal on the disk 1.

A reproducing-only head, a recording and reproducing head or a recording-only head is used as the above-mentioned head part 2 depending on the disk drive apparatus.

Figure 2:
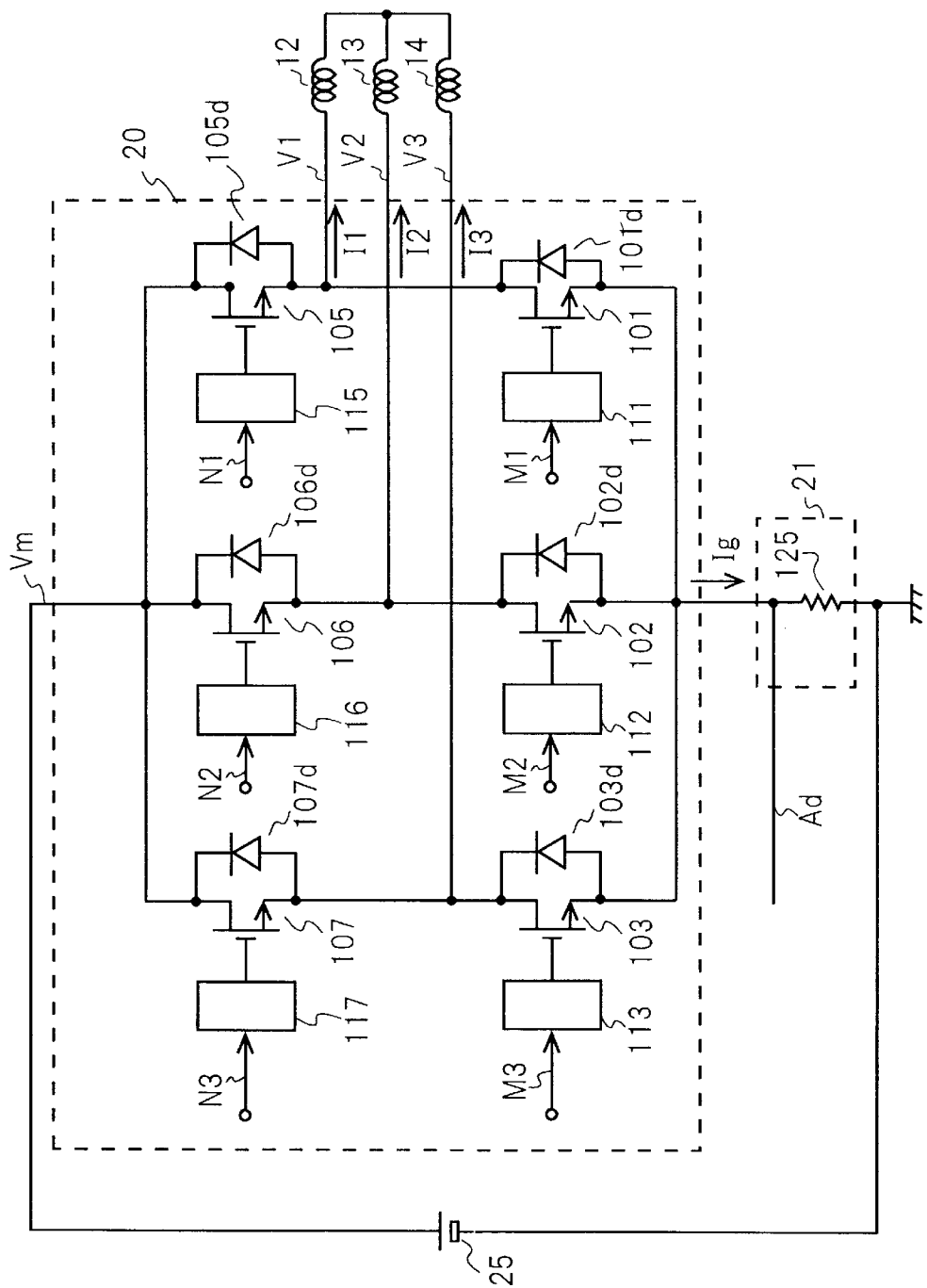
FIG. 2 is a circuit diagram of a power supplying part 20 and a current detecting part 21 in accordance with the embodiment 1.

The power supplying part 20 of FIG. 1 alters current paths from a voltage supplying part 25 to the three-phase windings 12, 13 and 14 responding with three-phase low-side activation control signals M1, M2 and M3 and three-phase high-side activation control signals N1, N2 and N3 of an activation control part 32, and supplies an electric power to the three-phase windings 12, 13 and 14. FIG. 2 shows a configuration of the power supplying part 20.

The power supplying part 20 of FIG. 2 includes three low-side power transistors 101, 102 and 103 and three high-side power transistors 105, 106 and 107. Each of the low-side power transistors 101, 102 and 103 forms a current path between the negative terminal (ground-side terminal) of the voltage supplying part 25 and each of the power supply terminals of the windings 12, 13 and 14, respectively. Each of the three high-side power transistors 105, 106 and 107 forms a current path between the positive terminal (Vm-side terminal) of the voltage supplying part 25 and each of the power supply terminals of the windings 12, 13 and 14, respectively. Three high-side power diodes 105d, 106d and 107d are connected reversely in parallel with the high-side power transistors 105, 106 and 107, respectively. That is, each high-side power diode forms a current path from the current output terminal to the current input terminal of each high-side power transistor (in a direction opposite to the direction of voltage application to each high-side power transistor). Furthermore, three low-side power diodes 101d, 102d and 103d are also connected reversely in parallel with the low-side power transistors 101, 102 and 103, respectively. That is, each low-side power diode forms a current path from the current output terminal to the current input terminal of each low-side power transistor (in a direction opposite to the direction of voltage application to each low-side power transistor). Besides, the low-side power diodes 101d, 102d and 103d may be omitted if unnecessary.

In the embodiment 1, NMOS-FET power transistors are used as the low-side power transistors 101, 102 and 103 and the high-side power transistors 105, 106 and 107. Each of the low-side FET power transistors 101, 102 and 103 has a parasitic diode which is connected reversely from the current flowing-out terminal to the current flowing-in terminal of each of the low-side FET power transistors, and the parasitic diode of each of the low-side FET power transistors 101, 102 and 103 is used as each of the low-side power diodes 101d, 102d and 103d, respectively. Similarly, each of the high-side FET power transistors 105, 106 and 107 has a parasitic diode which is connected reversely from the current flowing-out terminal to the current flowing-in terminal of each of the high-side FET power transistors, and the parasitic diode of each of the high-side FET power transistors 105, 106 and 107 is used as each of the high-side power diodes 105d, 106d and 107d, respectively.

Besides, the low-side power transistors 101, 102 and 103 and the high-side power transistors 105, 106 and 107 are not limited to FET transistors having the same polarity. FET transistors having different polarities can also be used, wherein PMOS-FET power transistors can be used as the high-side power transistors while NMOS-FET power transistors can be used as the low-side power transistors. Furthermore, the low-side power transistors 101, 102 and 103 and the high-side power transistors 105, 106 and 107 are not limited to FET transistors, but bipolar transistors or IGBT transistors may also be used as those power transistors.

The low-side activate circuits 111, 112 and 113 of the power supplying part 20 control On and OFF of the low-side power transistors 101, 102 and 103 responding with the low-side-activation control signals M1, M2 and M3, respectively. The low-side power transistors 101, 102 and 103 form current paths for supplying the negative parts of the three-phase drive current signals I1, I2 and I3 to the three-phase windings 12, 13 and 14. Since the low-side activation control signals M1, M2 and M3 are digital PWM signals (pulse width modulation signals) in their respective active periods, the low-side power transistors 101, 102 and 103 perform ON-OFF high-frequency switching. When the low-side power transistor 101 is ON, the terminal voltage V1 of the winding 12 becomes 0 V or nearly 0 V, and the negative part of the drive current signal I1 is supplied to the winding 12. When the low-side power transistor 101 turns OFF, the high-side power diode 105d becomes active, and the terminal voltage V1 of the winding 12 becomes Vm or nearly Vm, and the negative part of the drive current signal I1 is continuously supplied to the winding 12. Hence, the terminal voltage V1 of the winding 12 becomes a PWM voltage responding with the low-side activation control signal M1, and the terminal voltage V1 of the winding 12 is digitally changed between nearly 0 V and nearly Vm in the active period of the low-side activation control signal M1. Similarly, the terminal voltage V2 of the winding 13 is digitally changed between nearly 0 V and nearly Vm in the active period of the low-side activation control signal M2, and the terminal voltage V3 of the winding 14 is digitally changed between nearly 0 V and nearly Vm in the active period of the low-side activation control signal M3. As a result, the terminal voltages V1, V2 and V3 of the windings 12, 13 and 14 become PWM voltages (high-frequency switching voltages) in their respective active periods of the low-side power transistors 101, 102 and 103, respectively.

The high-side activate circuits 115, 116 and 117 of the power supplying part 20 control ON and OFF of the high-side power transistors 105, 106 and 107 responding with the high-side activation control signals N1, N2 and N3, respectively. The high-side power transistors 105, 106 and 107 form current paths for supplying the positive parts of the three-phase drive current signals I1, I2 and I3 to the three-phase windings 12, 13 and 14, respectively.

Besides, when NMOS-FET power transistors are used as the high-side power transistors 105, 106 and 107, the high-side activate circuits output control signals for activating the high-side power transistors 105, 106 and 107 by using a high potential higher than the positive potential Vm of the voltage supplying part 25 by a predetermined value. Therefore, the high-side activate circuits can fully turn on the NMOS-FET power transistors. Furthermore, the power losses of the high-side power diodes 105d, 106d and 107d can be reduced by executing complementary OFF-ON synchronous switching operation of a high-side power transistor in phase with a low-side power transistor performing ON-OFF high-frequency switching operation.

A current-detecting part 21 includes a current detecting resistor 125, and outputs a current-detection signal Ad proportional to a composed supply current Ig to the three-phase windings 12, 13 and 14 via the low-side power transistors 101, 102 and 103. Since the low-side power transistors 101, 102 and 103 perform ON-OFF high-frequency switching operation, the composed supply current Ig and the current-detection signal Ad become pulse signals.

Figure 3:
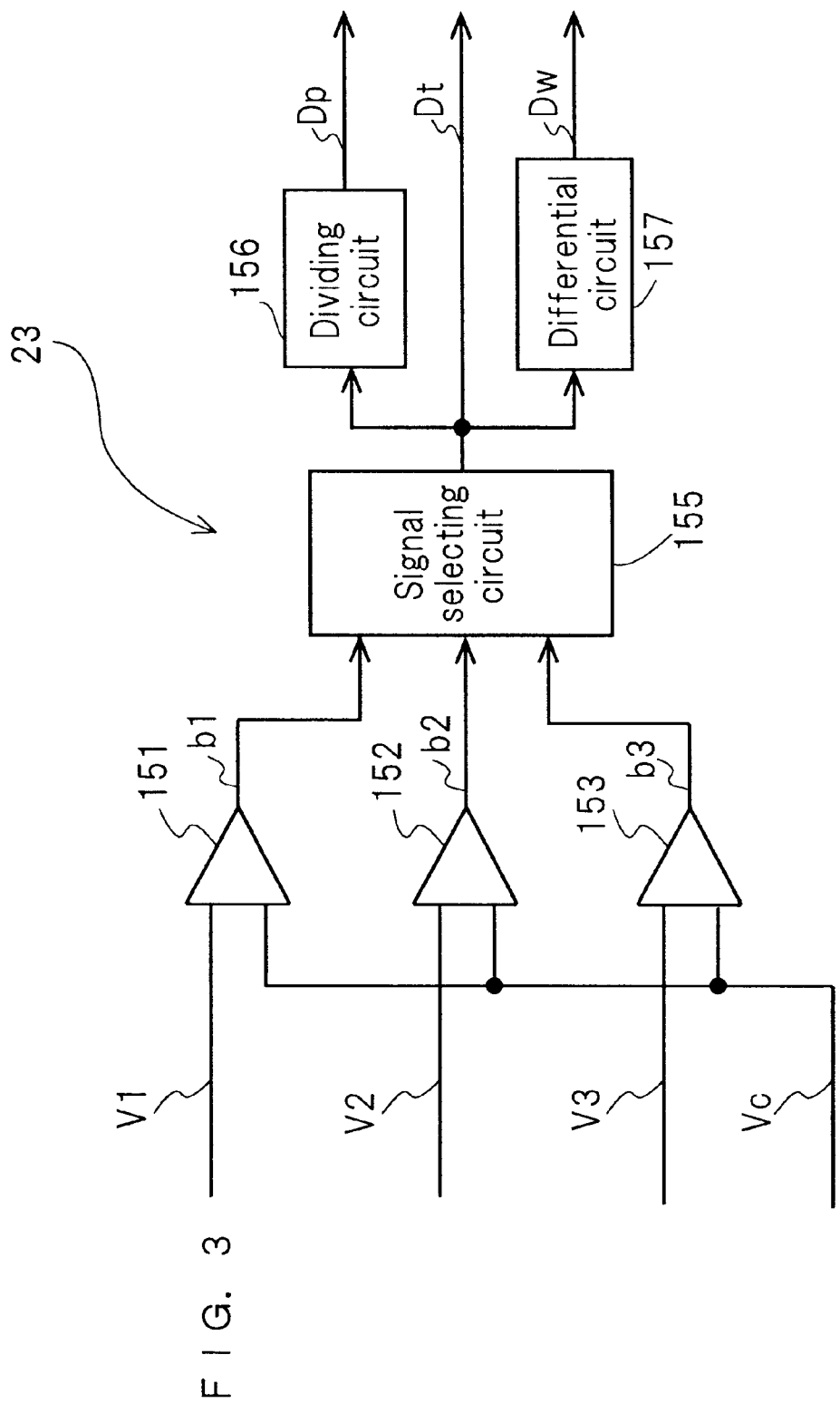
FIG. 3 is a circuit diagram of a voltage detecting part 23 in accordance with the embodiment 1.
Figure 4:
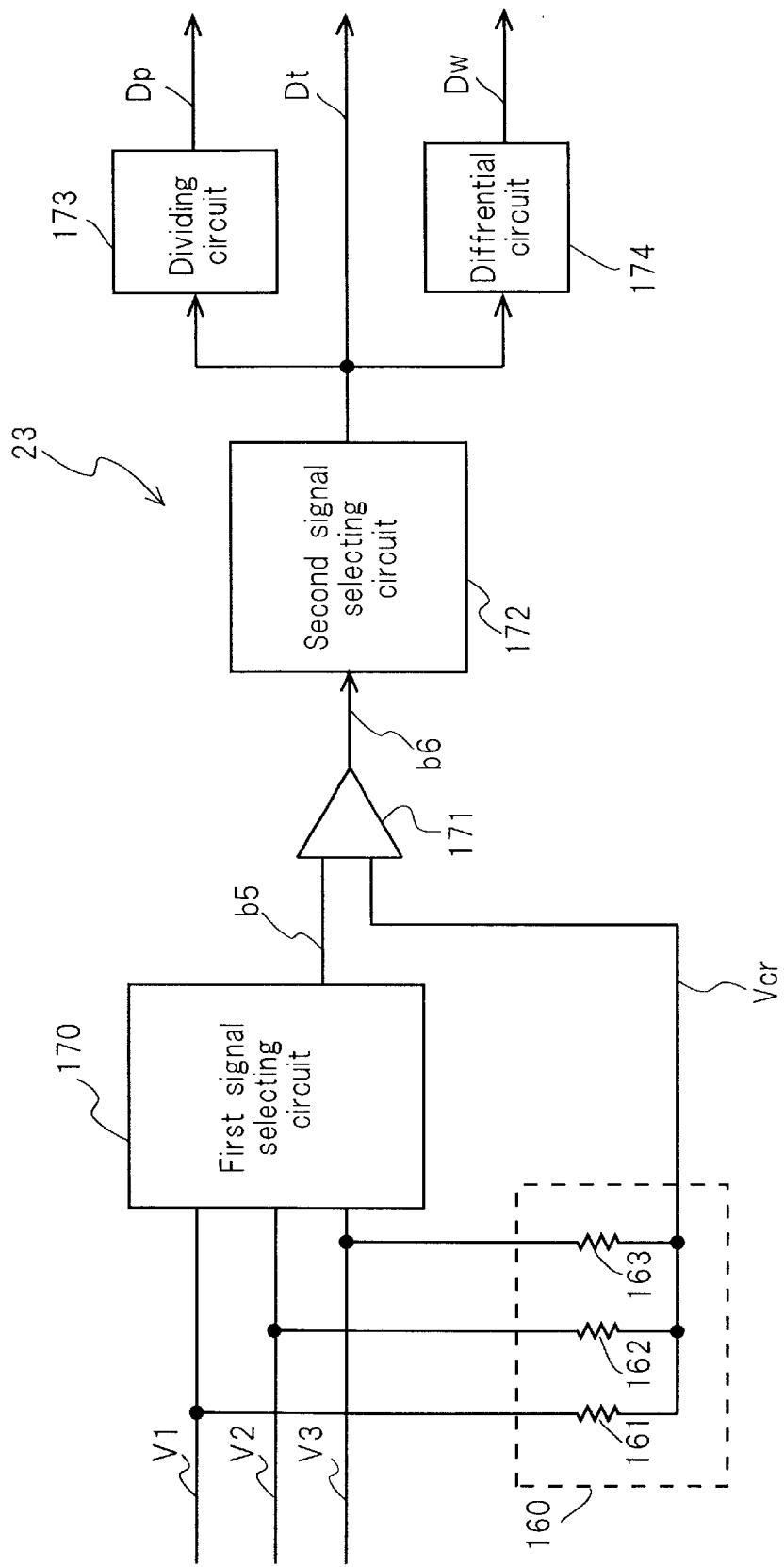
FIG. 4 is another circuit diagram of the voltage detecting part 23 in accordance with the embodiment 1.

The voltage detecting part 23 of FIG. 1 detects the terminal voltages of the windings 12, 13 and 14 and outputs a detected pulse signal. The three-phase terminal voltages V1, V2 and V3 at the power supply terminals of the three-phase windings 12, 13 and 14 and the common terminal voltage Vc at the common-connected terminal of the three-phase-windings 12, 13 and 14 are input to the voltage detecting part 23. FIG. 3 or FIG. 4 shows a configuration of the voltage detecting part 23.

In FIG. 3, the three comparator circuits 151, 152 and 153 of the voltage detecting part 23 compare the three-phase terminal voltages V1, V2 and V3 with the common terminal voltage Vc and output three-phase compared pulse signals b1, b2 and b3 responding with the comparison results. A signal selecting circuit 155 selectively detects the rising edge or the falling edge of one of the compared pulse signals b1, b2 and b3 depending on the state of the activation to the windings 12, 13 and 14, and outputs a detected pulse signal Dt by composing the detected edges. Furthermore, a dividing circuit 156 divides by 6 the detected pulse signal Dt and outputs a speed pulse signal Dp. The speed pulse signal Dp is a pulse signal responding with one-side edges of a compared pulse signal. In addition, a differential circuit 157 outputs a detection informing signal Dw at the generation timing of the rising edges of the detected pulse signal Dt.

Figure 12:
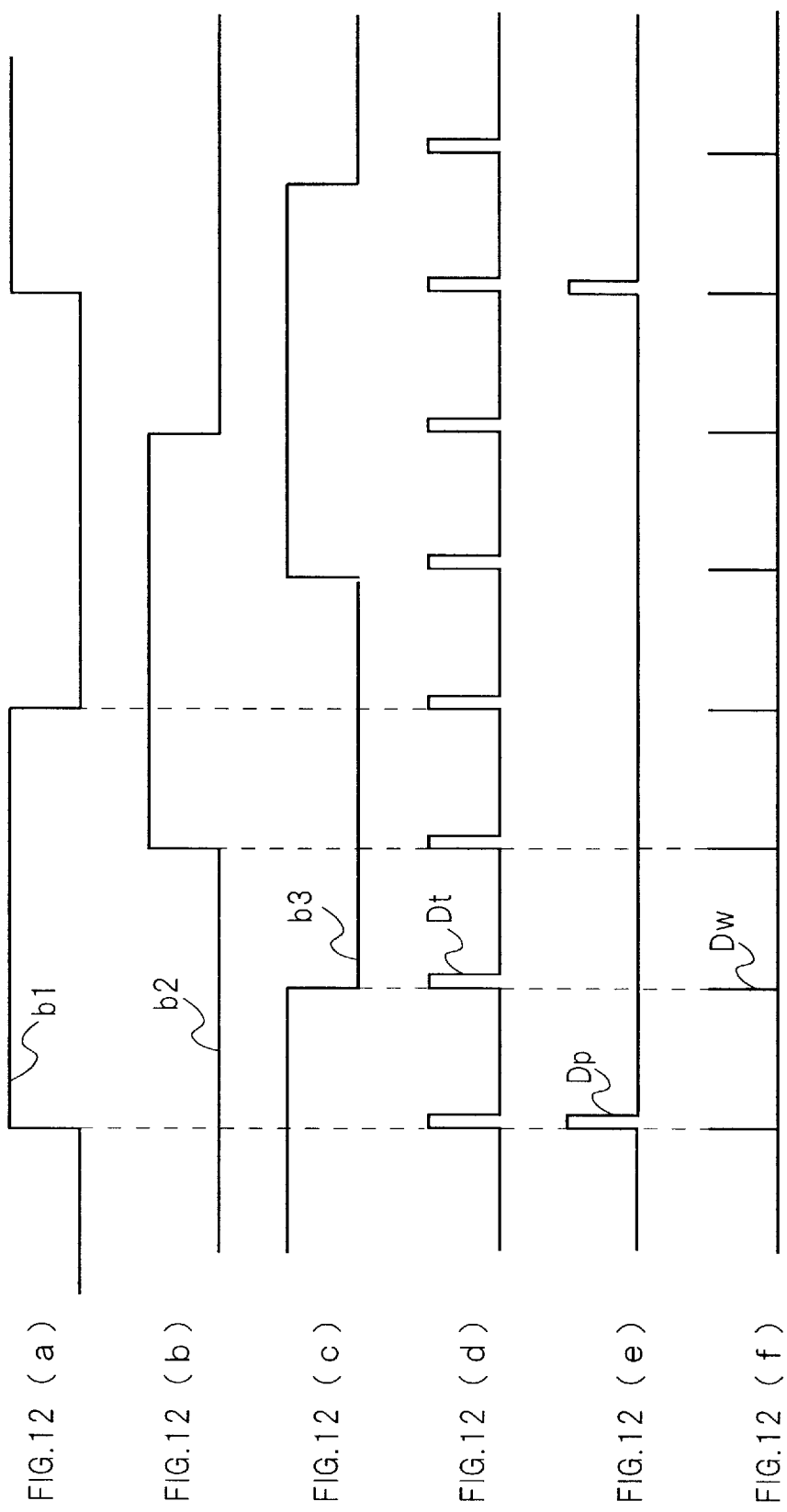
FIG. 12 is a waveform diagram illustrating the operation of the voltage detecting part 23 in accordance with the embodiment 1.

FIG. 12 shows waveforms for explaining the operation of the voltage detecting part 23 of FIG. 3. The parts (a), (b) and (c) of FIG. 12 show the three-phase compared pulse signals b1, b2 and b3, and the part (d) of FIG. 12 shows the detected pulse signal Dt which is obtained by composing selectively the rising and falling edges of the three-phase compared pulse signals b1, b2 and b3. The part (e) of FIG. 12 shows the speed pulse signal Dp which corresponds to the rising edges of the compared pulse signal b1. The part (f) of FIG. 12 shows the detection informing signal Dw which generates differential pulses at the rising edges of the detected pulse signal Dt. Besides, switching noises caused by the switching operation of the power transistors of the power supplying part 20 are abbreviated. Further, the signal selecting circuit 155 produces the detected pulse signal Dt by selecting the edges of the three-phase compared pulse signals b1, b2 and b3 responding with the hold state of a shift hold part 31 described later, and includes a noise eliminating circuit for eliminating the switching noises.

FIG. 4 shows another configuration of the voltage detecting part 23. The voltage composing circuit 160 of this voltage detecting part 23 produces a composed common voltage Vcr by composing the three-phase terminal voltages V1, V2 and V3 via resistors 161, 162 and 163. A first signal selecting circuit 170 selects one of the terminal voltages V1, V2 and V3 depending on the state of the activation to the windings 12, 13 and 14 and outputs a selected terminal voltage to a comparator circuit 171 as a selected output signal b5. The comparator circuit 171 compares the selected terminal voltage with the composed common voltage Vcr and outputs a compared pulse signal b6. A second signal selecting circuit 172 selects the rising and falling edges of the compared pulse signal b6 depending on the state of the activation to the windings 12, 13 and 14 and outputs the detected pulse signal Dt. Furthermore, a dividing circuit 173 divides by 6 the detected pulse signal Dt and outputs a speed pulse signal Dp. In addition, a differential circuit 174 outputs a detection informing signal Dw at the generation timing of the rising edges of the detected pulse signal Dt. Besides, switching noises caused by the switching operation of the power transistors of the power supplying part 20 are abbreviated. The first signal selecting circuit 170 selects one of the three-phase terminal voltages responding with the hold state of a shift hold part 31 described later, and the second signal selecting circuit 172 selects the rising and falling edges of the compared pulse signal b6 responding with the hold state of a shift hold part 31 described later. The second signal selecting circuit 172 includes a noise eliminating circuit for eliminating the switching noises.

The commanding part 26 of FIG. 1 comprises a speed control circuit for controlling the rotational speed of the disk 1 or the rotor 11 to an aimed speed. The speed control circuit detects the rotational speed of the disk 1 or the rotor 11 responding with the speed pulse signal Dp of the voltage detecting part 23, and outputs a command signal Ac responding with the difference between the detected rotational speed and the aimed speed. The command signal Ac is herein a voltage signal responding with the speed pulse signal Dp.

Figure 5:
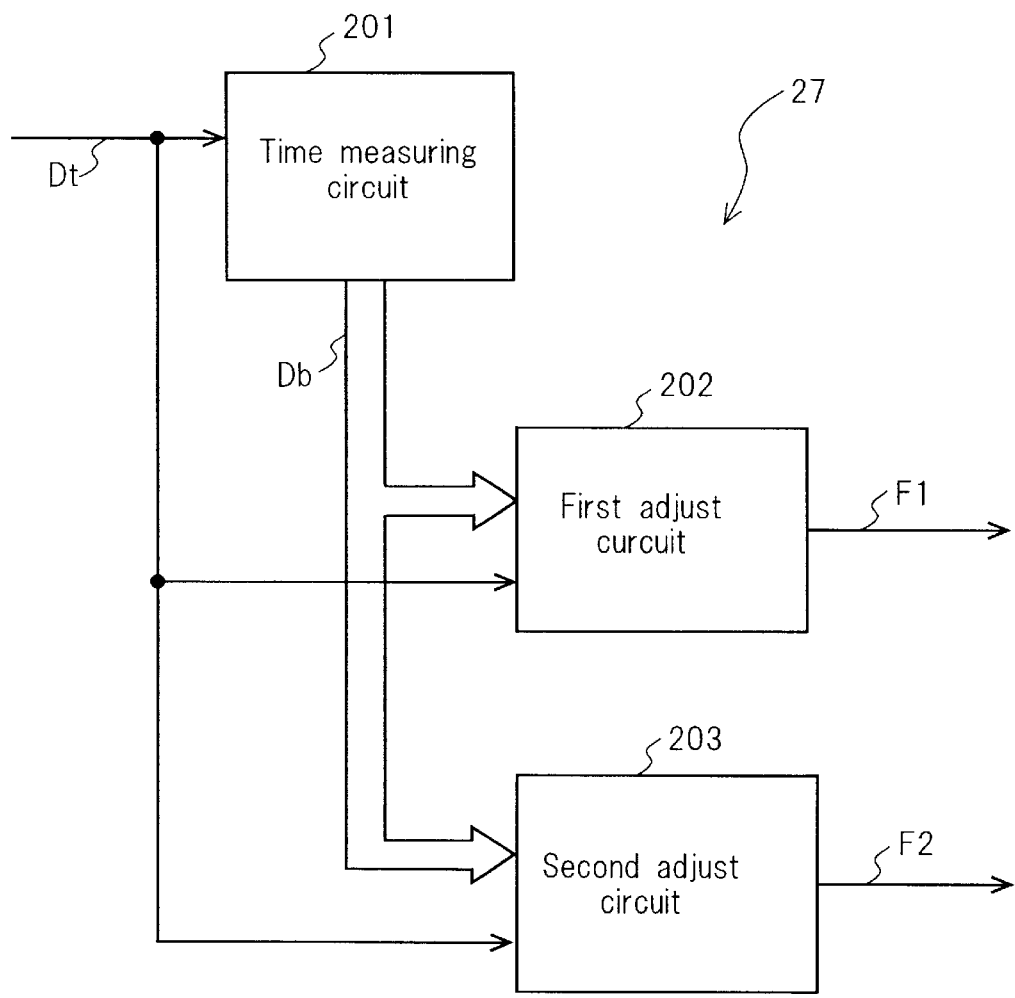
FIG. 5 is a circuit diagram of an adjusting part 27 of a state shifting part 35 in accordance with the embodiment 1.

The activation operation block 41 of FIG. 1 comprises a state shifting part 35 and an activation control part 32. The state shifting part 35 comprises an adjusting part 27 and a shift hold part 31. The adjusting part 27 outputs a first timing signal F1 delayed by a first adjust time T1 and a second timing signal F2 delayed by a second adjust time T2 from every occurrence of the rising edges of the detected pulse signal Dt of the voltage detecting part 23. FIG. 5 shows a configuration of the adjusting part 27.

The adjusting part 27 of FIG. 5 comprises a time measuring circuit 201, a first adjust circuit 202 and a second adjust circuit 203. The time measuring circuit 201 measures the time interval T0 of the rising edges of the detected pulse signal Dt, and outputs a count data signal Db responding with the time interval T0. The first adjust circuit 202 receives the count data signal Db at the generation timing of the rising edge of the detected pulse signal Dt, and outputs the first timing signal F1 delayed by the first adjust time T1 proportional or nearly proportional to the count data signal Db. Similarly, the second adjust circuit 203 receives the count data signal Db at the generation timing of the rising edge of the detected pulse signal Dt, and outputs the second timing signal F2 delayed by the second adjust time T2 proportional or nearly proportional to the count data signal Db.

The time measuring circuit 201 comprises an up-counter and a holding circuit, for example. The time measuring circuit 201 transfers the content of the up-counter to the holding circuit at every occurrence of the detected pulse signal Dt, and output the holding content of the holding circuit as the count data signal Db. Then, the time measuring circuit 201 resets the content of the up-counter which counts up a clock pulse signal. The first adjust circuit 202 comprises a first down-counter, for example. The first adjust circuit 202 transfers the count data signal Db to the first down-counter at the occurrence of the detected pulse signal Dt, and the first down-counter then counts down a first clock pulse signal. When the content of the first down-counter becomes zero, the first adjust circuit 202 outputs a short pulse as the first timing signal F1. The second adjust circuit 203 comprises a second down-counter, for example. The second adjust circuit 203 transfers the count data signal Db to the second down-counter at the occurrence of the detected pulse signal Dt, and the second down-counter then counts down a second clock pulse signal. When the content of the second down-counter becomes zero, the second adjust circuit 203 outputs a short pulse as the second timing signal F2. Since the frequency of the first clock pulse signal in the first adjust circuit 202 is higher than that of the second clock pulse signal in the second adjust circuit 203, the second adjust time T2 is longer than the first adjust time T1, that is, T2>T1.

Figure 13:
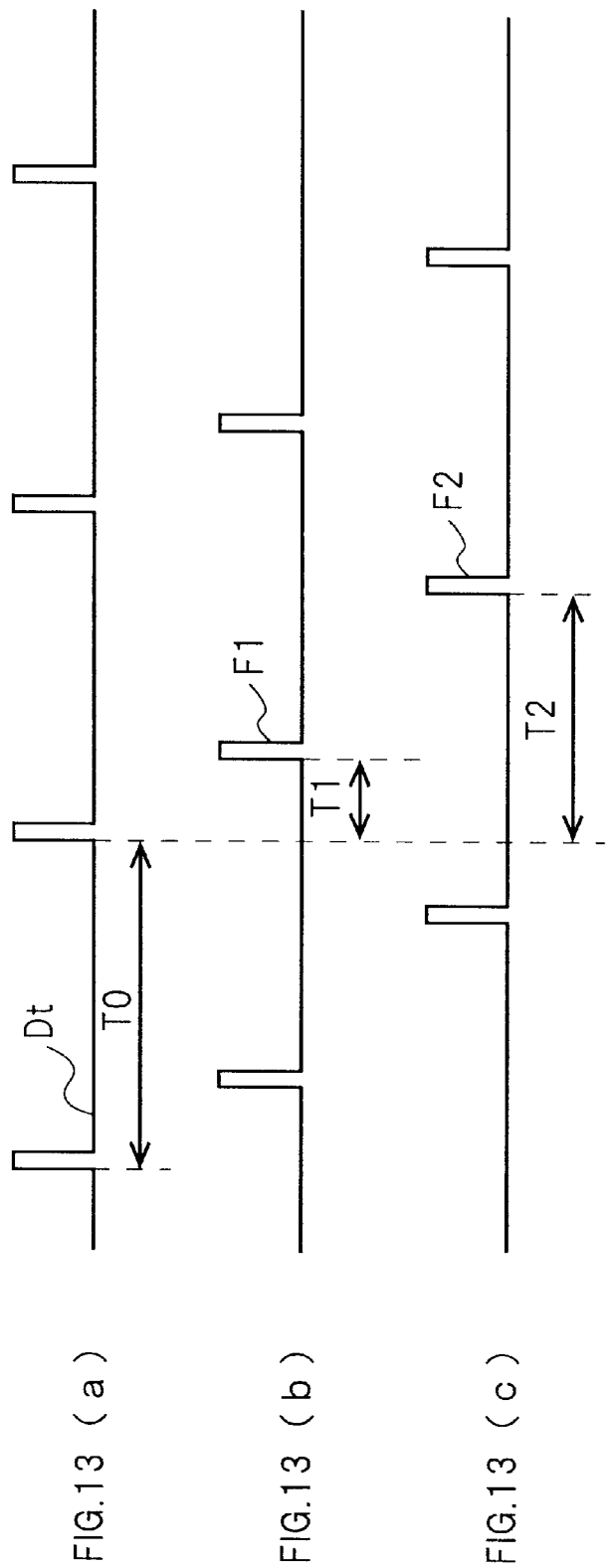
FIG. 13 is a waveform diagram illustrating the operation of the adjusting part 27 in accordance with the embodiment 1.

FIG. 13 shows the relationship among these signals. The time measuring circuit 201 measures the time interval T0 between the successive rising edges of the detected pulse signal Dt shown in the part (a) of FIG. 13, and outputs a count value corresponding to the time interval T0 as the count data signal Db. The first adjust circuit 202 outputs the first timing signal F1 (see the part (b) of FIG. 13), which is delayed by the first adjust time T1 proportional or nearly proportional to the time interval T0. In other words, the first timing signal F1 becomes a pulse signal delayed by the first adjust time T1 responding with the time interval T0 from the rising edge of the detected pulse signal Dt. The second adjust circuit 203 outputs the second timing signal F2 (see the part (c) of FIG. 13), which is delayed by the second adjust time T2 proportional or nearly proportional to the time interval T0. In other words, the second timing signal F2 becomes a pulse signal delayed by the second adjust time T2 responding with the time interval T0 from the rising edge of the detected pulse signal Dt. Besides, there is a relationship of T1<T2<T0.

The shift hold part 31 of the state shifting part 35 shown in FIG. 1 includes a state hold circuit for shift-holding its hold state in response to the occurrence of the first timing signal F1 and the second timing signal F2 of the adjusting part 27. The shift hold part 31 shifts its holding state in response to the first timing signal F1 and the second timing signal F2, and outputs three-phase low-side period signals P1, P2 and P3 and three-phase high-side period signals Q1, Q2 and Q3 corresponding to the holding state. In other words, one of the low-side period signals P1, P2 and P3 and the high-side period signals Q1, Q2 and Q3 is changed from "L" to "H" at the occurrence of the first timing signal F1, and one of the power transistors corresponding to the signal changed is activated. Furthermore, one of the low-side period signals P1, P2 and P3 and the high-side period signals Q1, Q2 and Q3 is changed from "H" to "L" at the occurrence of the second timing signal F2, and one of the power transistors corresponding to the signal changed is deactivated.

Figure 6:
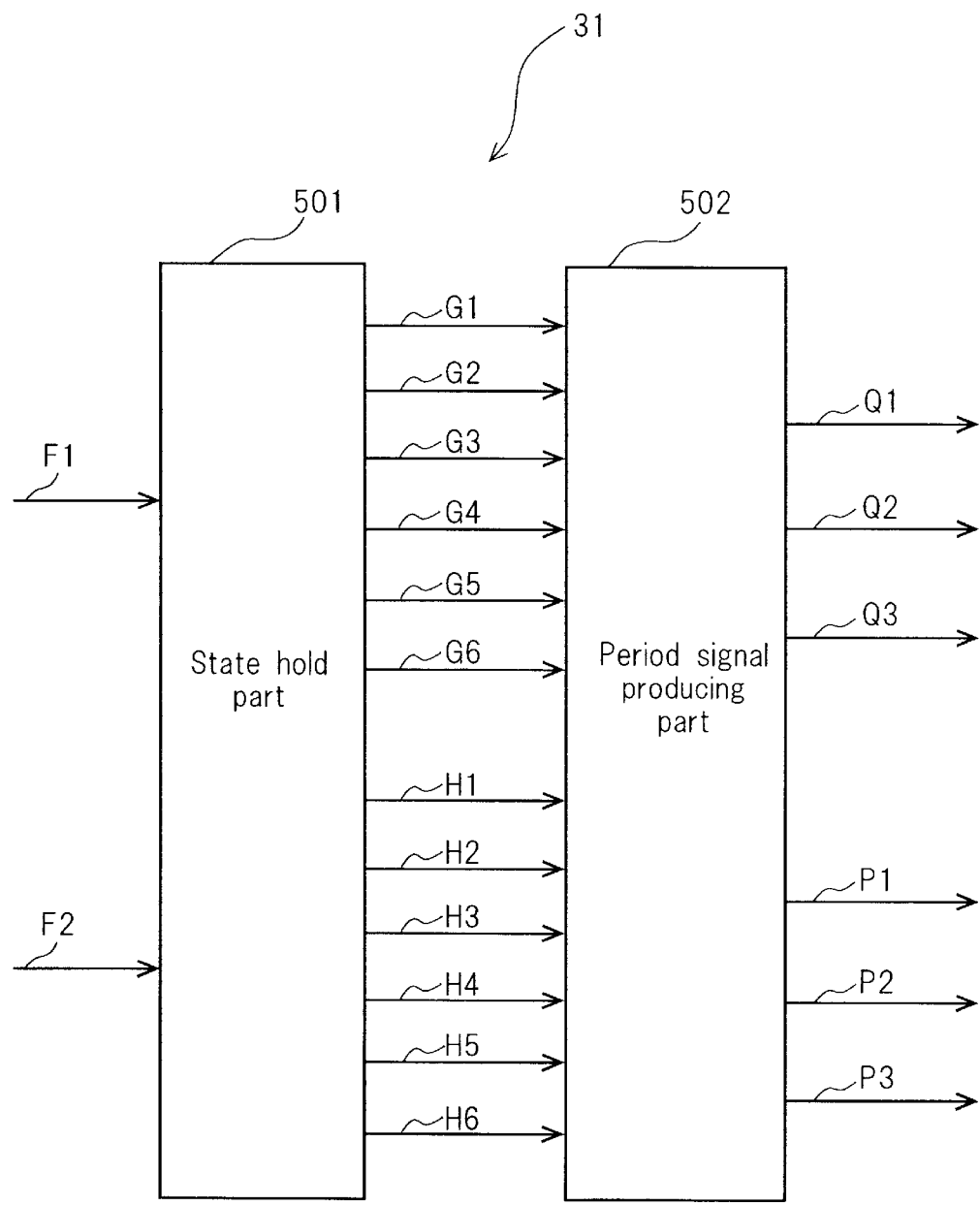
FIG. 6 is a circuit diagram of a shift hold part 31 of the state shifting part 35 in accordance with the embodiment 1.

The periods during which the low-side period signals P1, P2 and P3 of the shift hold part 31 become the "H" state correspond to the active periods of the low-side power transistors 101, 102 and 103 of the power supplying part 20, respectively. In each of the active periods, each of the low-side power transistors 101, 102 and 103 supplies each of the negative parts of the drive current signals I1, I2 and I3 to the windings 12, 13 and 14. The periods during which the high-side period signals Q1, Q2 and Q3 of the shift hold part 31 become the "H" state correspond to the active periods of the high-side power transistors 105, 106 and 107 of the power supplying part 20, respectively. In each of the active periods, each of the high-side power transistors 105, 106 and 107 supplies each of the positive parts of the drive current signals I1, I2 and I3 to the windings 12, 13 and 14. FIG. 6 shows a configuration of the shift hold part 31.

Figure 7:
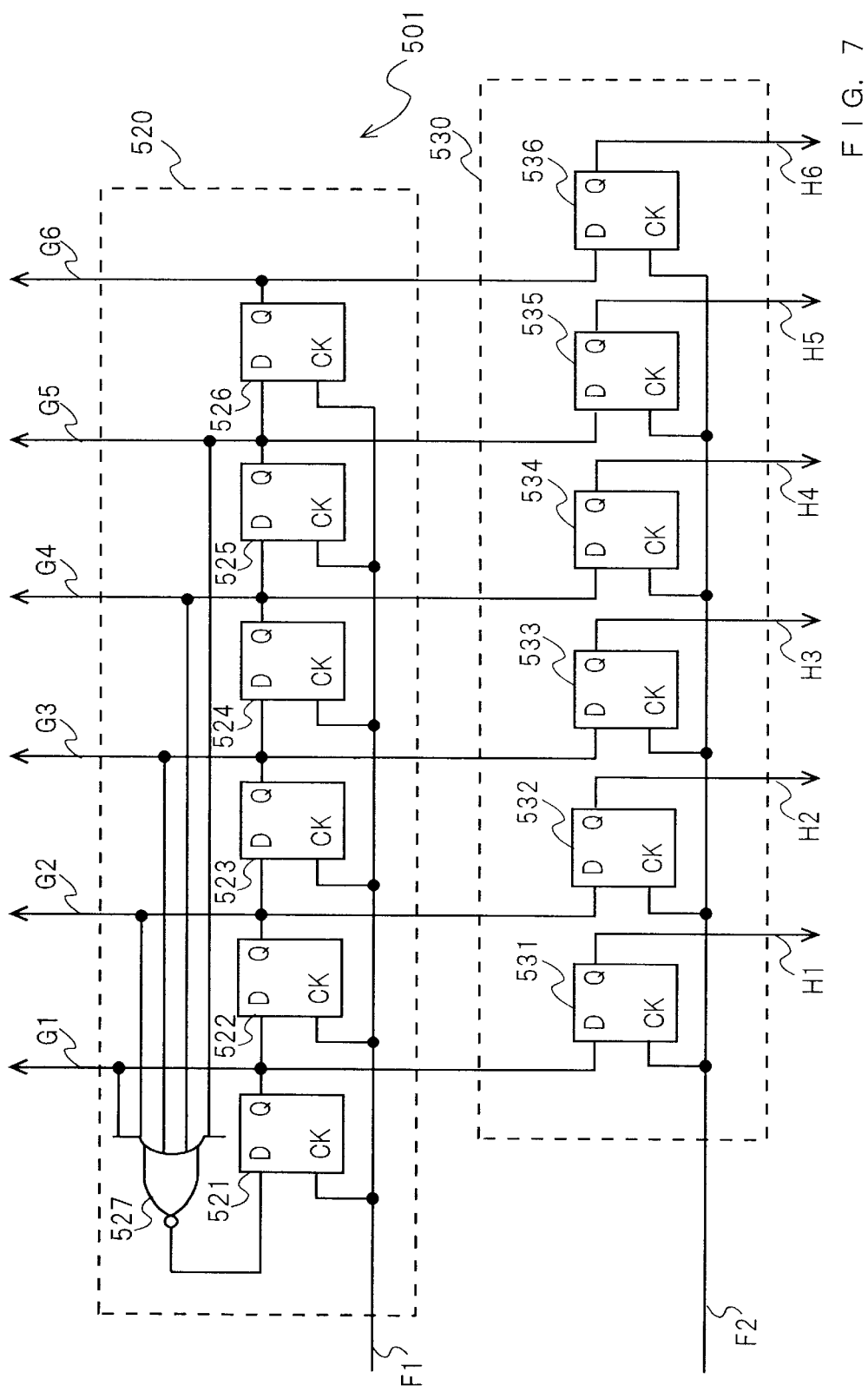
FIG. 7 is a circuit diagram of a state hold part 501 of the shift hold part 31 in accordance with the embodiment 1.

In FIG. 6, the shift hold part 31 comprises a state hold part 501 and a period signal producing part 502. The state hold part 501 shifts its holding state in response to the occurrence of the first timing signal F1 and the second timing signal F2, and outputs first state hold signals G1, G2, G3, G4, G5 and G6 and second state hold signals H1, H2, H3, H4, H5 and H6. The holding state of the shift hold part 31 of the state shifting part 35 means the composed state or the vector state of the first state hold signals G1, G2, G3, G4, G5 and G6 and the second state hold signals H1, H2, H3, H4, H5 and H6. The period signal producing part 502 composes the first state hold signals G1 to G6 and the second state hold signals H1 to H6, and outputs the low-side period signals P1, P2 and P3 and high-side period signals Q1, Q2 and Q3. FIG. 7 shows a configuration of the state hold part 501, and FIG. 8 shows a configuration of the period signal producing part 502.

In FIG. 7, the state hold part 501 comprises a first state hold circuit 520 and a second state hold circuit 530. The first state hold circuit 520 includes six D-type flip-flop circuits 521, 522, 523, 524, 525 and 526, which are designed so that one of the flip-flop circuits becomes the "H" state and the other flip-flop circuits become the "L" state. The states of the flip-flop circuits 521, 522, 523, 524, 525 and 526 are shifted at the rising edge of the first timing signal F1, and the "H" state is shifted in sequence just as in the case of a ring counter. The first state hold circuit 520 outputs the internal states of the six flip-flop circuits 521, 522, 523, 524, 525 and 526 as the first state hold signals G1, G2, G3, G4, G5 and G6, respectively. The second state hold circuit 530 comprises six D-type flip-flop circuits 531, 532, 533, 534, 535 and 536. The first state hold signals G1 to G6 are input to the data input terminals of the flip-flop circuits 531, 532, 533, 534, 535 and 536, respectively. At the rising edge of the second timing signal F2, the first state hold signals G1, G2, G3, G4, G5 and G6 are input to the internal states of the flip-flop circuits 531, 532, 533, 534, 535 and 536, and their outputs are changed. The second state hold circuit 530 outputs the internal states of the six flip-flop circuits 531, 532, 533, 534, 535 and 536 as the second state hold signals H1, H2, H3, H4, H5 and H6, respectively.

Figure 8:
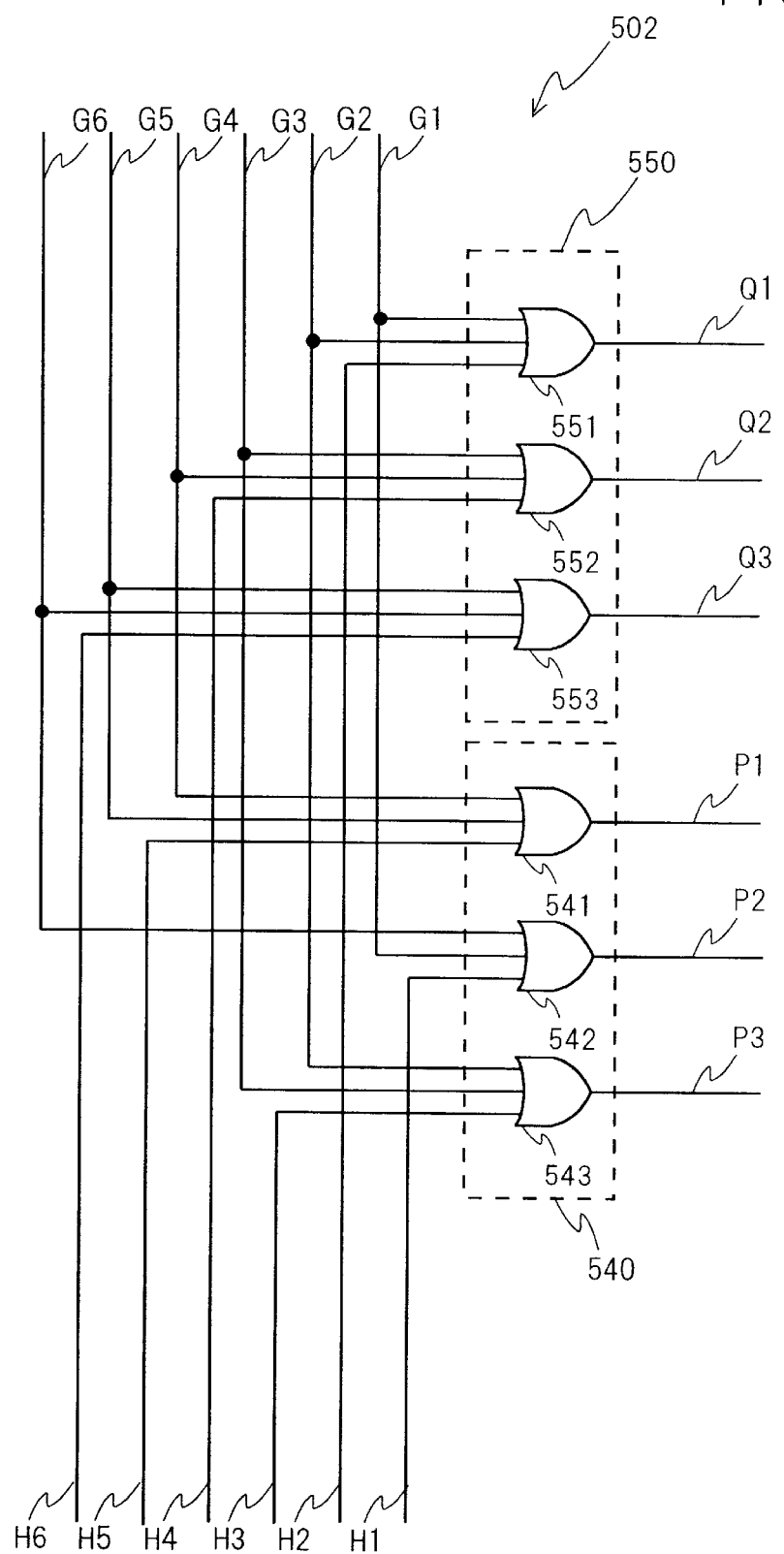
FIG. 8 is a circuit diagram of a period signal producing part 502 of the shift hold part 31 in accordance with the embodiment 1.

The period signal producing part 502 of FIG. 8 comprises a low-side period signal producing circuit 540 and a high-side period signal producing circuit 550. The low-side period signal producing circuit 540 produces the low-side period signals P1, P2 and P3 responding with the holding state (the first state hold signals G1 to G6 and the second state hold signals H1 to H6) of the state hold part 501. The "H" state periods of the low-side period signals P1, P2 and P3 correspond to the active periods of the low-side power transistors 101, 102 and 103 of the power supplying part 20, respectively. The high-side period signal producing circuit 550 produces the high-side period signals Q1, Q2 and Q3 responding with the holding state (the first state hold signals G1 to G6 and the second state hold signals H1 to H6) of the state hold part 501. The "H" state periods of the high-side period signals Q1, Q2 and Q3 correspond to the active periods of the high-side power transistors 105, 106 and 107 of the power supplying part 20, respectively. As a result, the active periods of the power transistors correspond to the holding state (the first state hold signals and the second state hold signals).

Figure 14:
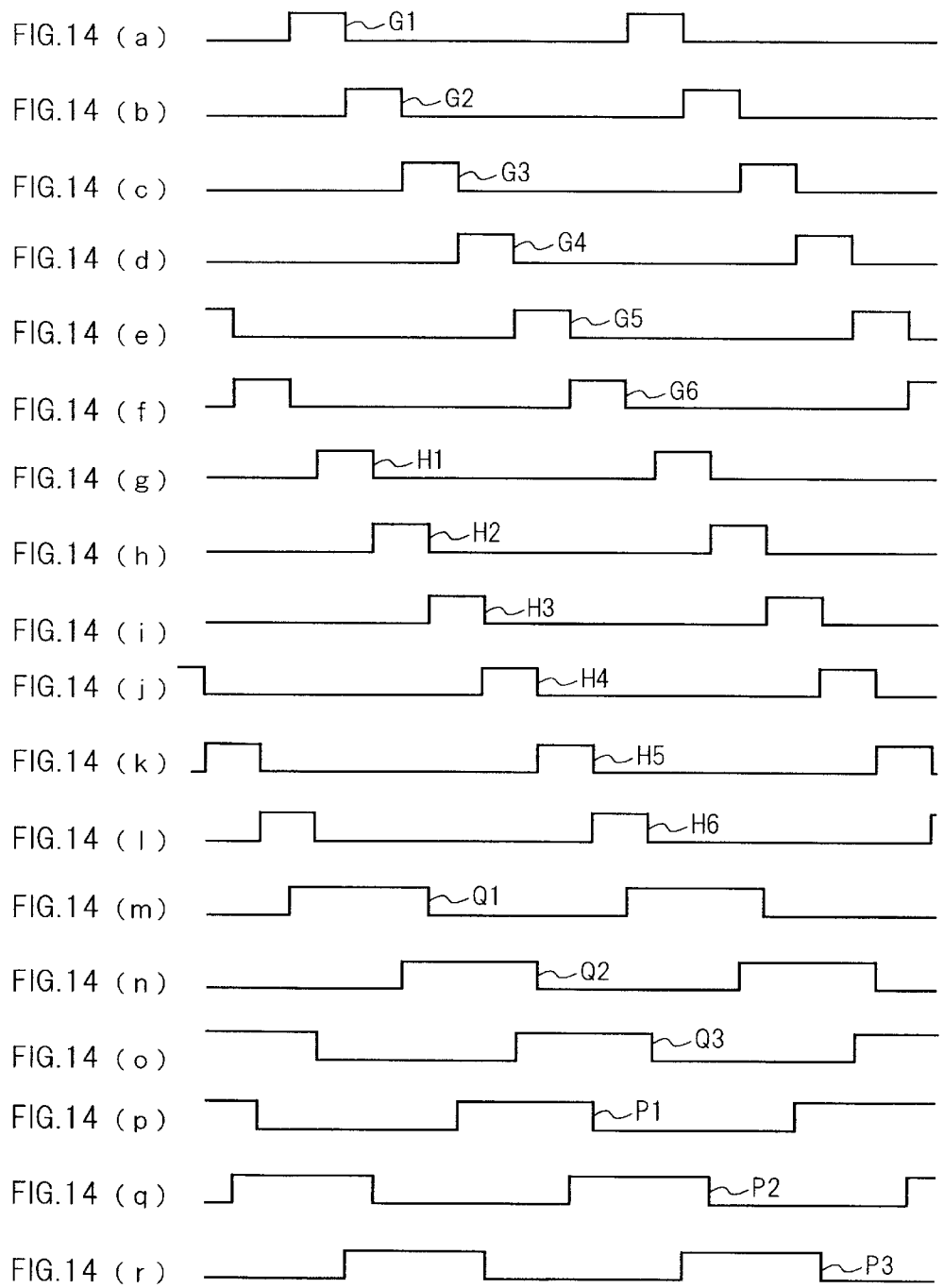
FIG. 14 is a waveform diagram illustrating the operation of the state hold part 501 and the period signal producing part 502 in accordance with the embodiment 1.

FIG. 14 shows the relationship among the low-side period signals P1, P2 and P3, the high-side period signals Q1, Q2 and Q3, the first state hold signals G1 to G6 and the second state hold signals H1 to H6. The abscissa of FIG. 14 represents time. The first state hold signals G1 to G6 (see the parts (a) to (f) of FIG. 14) are six-phase signals, wherein one "H" signal is shifted at every occurrence of the first timing signal F1. The second state hold signals H1 to H6 (see the parts (g) to (l) of FIG. 14) are six-phase signals, wherein one "H" signal is shifted at every occurrence of the second timing signal F2. The low-side period signals P1, P2 and P3 are produced by composing the first state hold signals G1 to G6 and the second state hold signals H1 to H6, and each of the low-side period signals P1, P2 and P3 has one "H" period larger than an electrical angle of 120 degrees (see the parts (p) to (r) of FIG. 14). More specifically, the low-side period signals P1, P2 and P3 are three-phase signals, each having one "H" period of about 140 degrees. An electrical angle of 360 degrees corresponds to the rotation angle of a pair of the N and S poles of the rotor 11. In a similar way, the high-side period signals Q1, Q2 and Q3 are produced by composing the first state hold signals G1 to G6 and the second state hold signals H1 to H6, and each of the high-side period signals Q1, Q2 and Q3 has one "H" period larger than an electrical angle of 120 degrees (see the parts (m) to (o) of FIG. 14). More specifically, the high-side period signals Q1, Q2 and Q3 are three-phase signals, each having one "H" period of about 140 degrees.

The shift hold part 31 of the state shifting part 35 shown in FIG. 1 shifts its holding state in response to the occurrence of the first timing signal F1 and the second timing signal F2 of the adjusting part 27. In other words, the shift hold part 31 shifts its holding state from a first state to a second state in response to the first timing signal F1 and shifts its holding state from the second state to a third state in response to the second timing signal F2. The shift hold part 31 outputs three-phase low-side period signals P1, P2 and P3 and three-phase high-side period signals Q1, Q2 and Q3 corresponding to the holding state. Hence, one of the low-side period signals P1, P2 and P3 and the high-side period signals Q1, Q2 and Q3 is changed from "L" to "H" at the occurrence of the first timing signal F1, and one of the power transistors corresponding to the signal changed is activated. Furthermore, one of the low-side period signals P1, P2 and P3 and the high-side period signals Q1, Q2 and Q3 is changed from "H" to "L" at the occurrence of the second timing signal F2, and one of the power transistors corresponding to the signal changed is deactivated.

The periods during which the low-side period signals P1, P2 and P3 of the shift hold part 31 become the "H" state correspond to the active periods of the low-side power transistors 101, 102 and 103 of the power supplying part 20, respectively. In each of the active periods, each of the low-side power transistors 101, 102 and 103 supplies each of the negative parts of the drive current signals I1, I2 and I3 to the windings 12, 13 and 14. The periods during which the high-side period signals Q1, Q2 and Q3 of the shift hold part 31 become the "H" state correspond to the active periods of the high-side power transistors 105, 106 and 107, respectively. In each of the active periods, each of the high-side power transistors 105, 106 and 107 supplies each of the positive parts of the drive current signals I1, I2 and I3 to the windings 12, 13 and 14.

Figure 15:
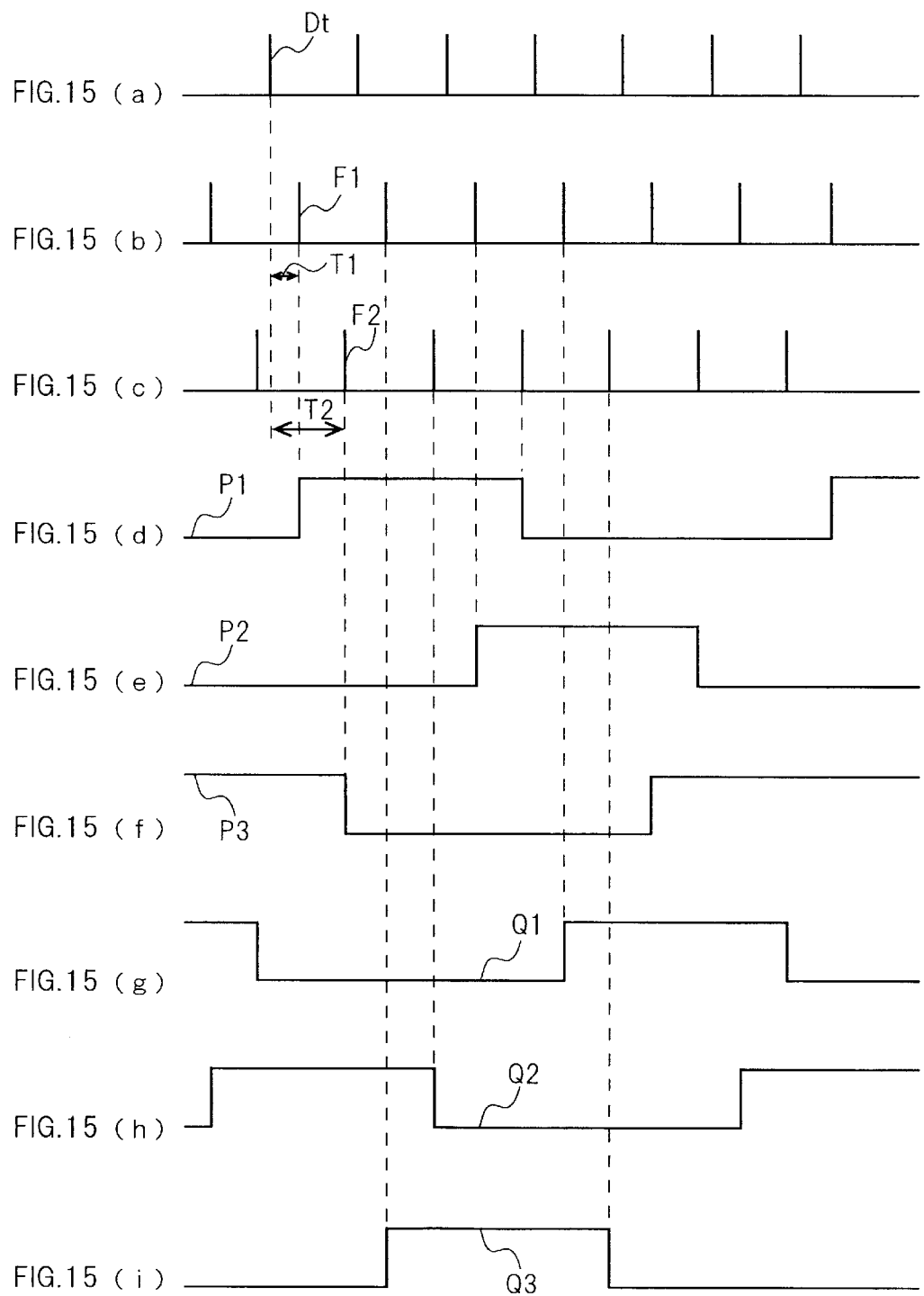
FIG. 15 is a waveform diagram illustrating the operation of the shift hold part 31 in accordance with the embodiment 1.

FIG. 15 shows the relationship among these signals. The first timing signal F1 (see the part (b) of FIG. 15) is a pulse signal delayed by the first adjust time T1 from the detected pulse signal Dt (see the part (a) of FIG. 15). The second timing signal F2 (see the part (c) of FIG. 15) is a pulse signal delayed by the second adjust time T2 from the detected pulse signal Dt. The shift hold part 31 shifts its holding state in sequence at every occurrence of the first timing signal F1 and the second timing signal F2, whereby twelve (12) holding states are repeated cyclically. This produces the three-phase low-side period signals P1, P2 and P3 (see the parts (d), (e) and (f) of FIG. 15) and the three-phase high-side period signals Q1, Q2 and Q3 (see the parts (g), (h) and (i) of FIG. 15). The low-side period signal P1 changes from "L" to "H" at the occurrence of the first timing signal F1, for example, and the low-side power transistor 101 becomes activated. The low-side period signal P3 changes from "H" to "L" at the occurrence of the second timing signal F2, and the low-side power transistor 103 becomes deactivated. The high-side period signal Q3 changes from "L" to "H" at the next occurrence of the first timing signal F1, and the high-side power transistor 107 becomes activated. The high-side period signal Q2 changes from "H" to "L" at the next occurrence of the second timing signal F2, and the high-side power transistor 106 becomes deactivated. Furthermore, the low-side period signal P2 changes from "L" to "H" at the next occurrence of the first timing signal F1, and the low-side power transistor 102 becomes activated. The low-side period signal P1 changes from "H" to "L" at the next occurrence of the second timing signal F2, and the low-side power transistor 101 becomes deactivated. In addition, the high-side period signal Q1 changes from "L" to "H" at the next occurrence of the first timing signal F1, and the high-side power transistor 105 becomes activated. The high-side period signal Q3 changes from "H" to "L" at the next occurrence of the second timing signal F2, and the high-side power transistor 107 becomes deactivated. In this way, the shift hold part 31 outputs the three-phase low-side period signals P1, P2 and P3 and the three-phase high-side period signals Q1, Q2 and Q3, and determines the active periods of the low-side power transistors 101, 102 and 103 and the high-side power transistors 105, 106 and 107 of the power supplying part 20. As understood by referring to FIG. 15, a power transistor becomes activated in response to the first timing signal F1 which is produced after the first adjust time T1 from the occurrence of the detected pulse signal Dt. Another power transistor becomes deactivated in response to the second timing signal F2 which is produced after the second adjust time T2 from the occurrence of the detected pulse signal Dt.

As a result, the low-side period signals P1, P2 and P3 become three-phase signals, each having one "H" period larger than an electrical angle of 120 degrees (see the parts (d) to (f) of FIG. 15). More specifically, the low-side period signals P1, P2 and P3 become three-phase signals, each having one "H" period of about 150 degrees. In a similar way, the high-side period signals Q1, Q2 and Q3 become three-phase signals, each having one "H" period larger than an electrical angle of 120 degrees (see the parts (g) to (i) of FIG. 15). More specifically, the high-side period signals Q1, Q2 and Q3 become three-phase signals, each having one "H" period of about 150 degrees. Furthermore, since the second adjust time T2 is longer than the first adjust time T1, the activation to two of the three-phase windings and the activation to all of the three-phase windings are alternated in accordance with the rotation of the rotor 11, thereby altering smoothly current paths to the three-phase windings.

Figure 9:
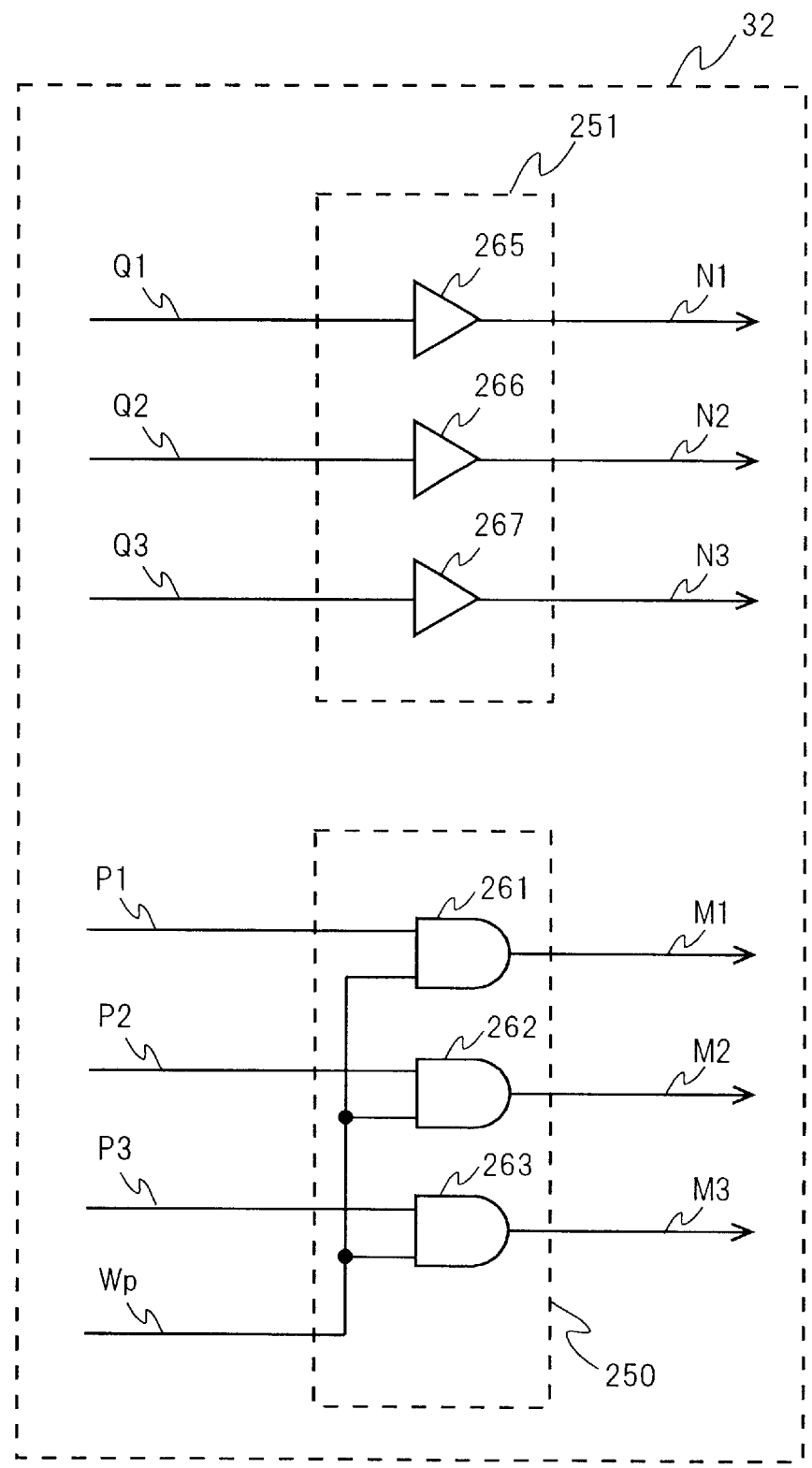
FIG. 9 is a circuit diagram of an activation control part 32 in accordance with the embodiment 1.

The activation control part 32 of FIG. 1 outputs the low-side activation control signals M1, M2 and M3 and the high-side activation control signals N1, N2 and N3 responding with the low-side period signals P1, P2 and P3 and the high-side period signals Q1, Q2 and Q3 of the shift hold part 31, respectively. Therefore, the periods of activation to the windings are determined by the low-side period signals and the high-side period signals. Furthermore, the activation control part 32 converts the low-side activation control signals M1, M2 and M3 into high-frequency switching signals responding with the switching pulse signal Wp of the switching control part 22. FIG. 9 shows a configuration of the activation control part 32.

The low-side activation circuit 250 of FIG. 9 composes the switching pulse signal Wp of the switching control part 22 and the low-side period signals P1, P2 and P3, and outputs the low-side activation control signals M1, M2 and M3. Each of the low-side activation control signals M1, M2 and M3 is coincident in timing with the switching pulse signal Wp in each active period. The high-side activation circuit 251 outputs the high-side activation control signals N1, N2 and N3 from the high-side period signals Q1, Q2 and Q3 through the buffer circuits 265, 266 and 267, respectively.

Figure 10:
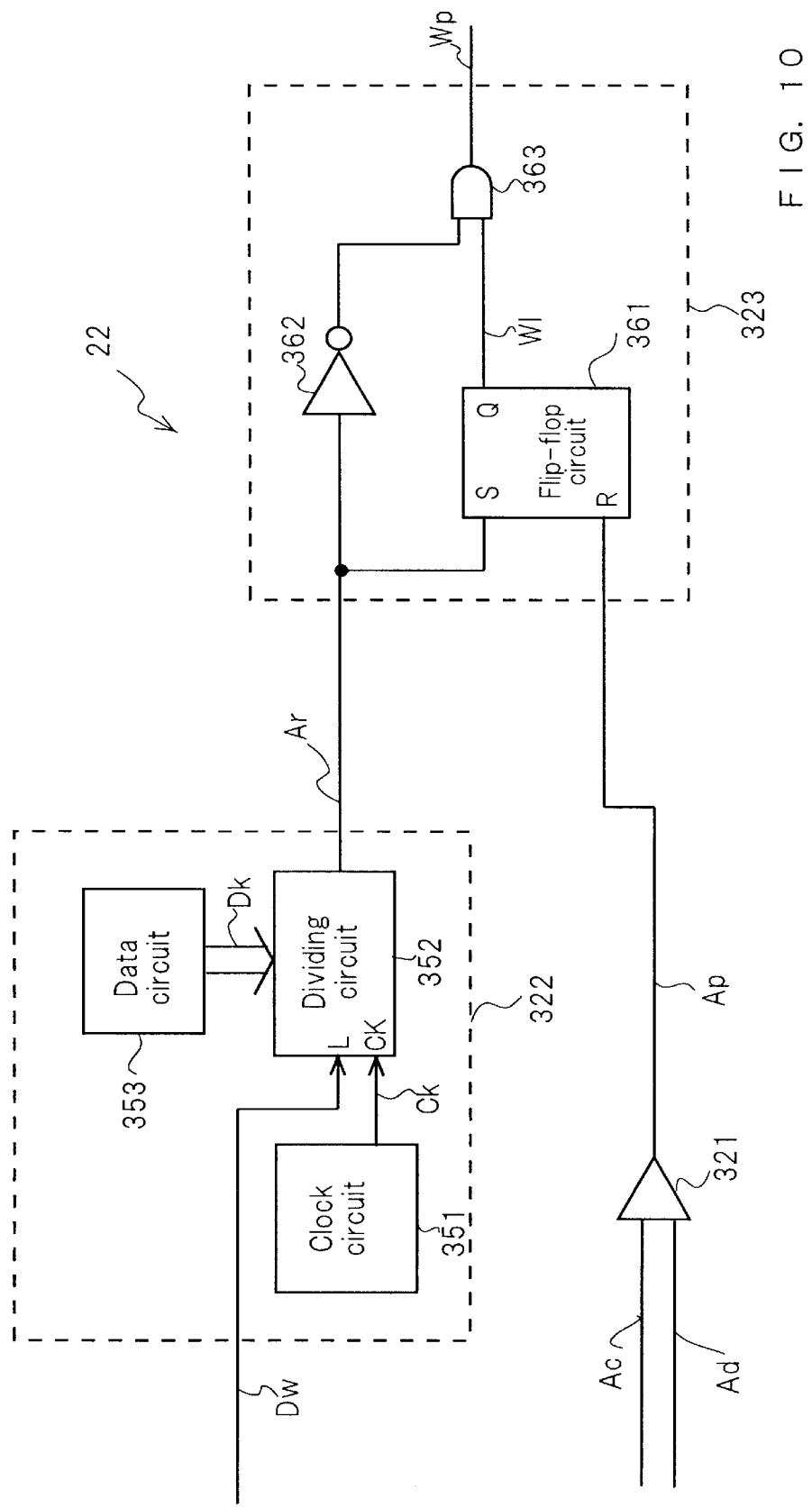
FIG. 10 is a circuit diagram of a switching control part 22 in accordance with the embodiment 1.

The switching operation block 42 of FIG. 1 comprises a current detecting part 21 and a switching control part 22. The switching control part 22 compares the current-detection signal Ad of the current detecting part 21 with the command signal Ac of the commanding part 26, and outputs the switching pulse signal Wp responding with the comparison result. The switching pulse signal Wp of the switching control part 22 is input to the activation control part 32. The low-side power transistors 101, 102 and 103 execute ON-OFF high-frequency switching simultaneously in response to the switching pulse signal Wp in their active periods. Therefore, when the low-side period signals P1 and P2 are "H" and the low-side period signal P3 is "L", the low-side power transistors 101 and 102 perform ON-OFF high-frequency switching simultaneously in response to the switching pulse signal Wp. As soon as the current-detection signal Ad reaches the command signal Ac when one or two of the low-side power transistors 101, 102 and 103 are ON, the switching pulse signal Wp becomes "L". Hence, the peak value of the composed supply current Ig supplied to the three-phase windings 12, 13 and 14 by the low-side power transistors 101, 102 and 103 is controlled to be proportional or nearly proportional to the command signal Ac. As a result, the amplitudes of the drive current signals I1, I2 and I3 to the three-phase windings 12, 13 and 14 are controlled in response to the command signal Ac. Furthermore, the switching control part 22 receives the detection informing signal Dw of the voltage detecting part 23, and shifts or changes the occurrence timing of the switching pulse signal Wp depending on the occurrence of the detection informing signal Dw. FIG. 10 shows a configuration of the switching control part 22.

The switching control part 22 of FIG. 10 comprises a comparing circuit 321, a trigger pulse circuit 322 and a PWM pulse circuit 323. The comparing circuit 321 compares the current-detection signal Ad with the command signal Ac, and changes its compared signal Ap to "H" when the current-detection signal Ad becomes larger than the command signal Ac.

The trigger pulse circuit 322 comprises a clock circuit 351, a dividing circuit 352 and a data circuit 353. When the detection informing signal Dw is "L", the dividing circuit 352 of the trigger pulse circuit 322 divides by a predetermined number the clock signal Ck of the clock circuit 351 and outputs a trigger pulse signal Ar at every predetermined time interval Tr. The trigger pulse circuit 322 transfers the data signal Dk of the data circuit 353 to the dividing circuit 352 at the rising edge of the detection informing signal Dw, thereby setting a desired value in the dividing circuit 352. The dividing circuit 352 then divides the clock signal Ck of the clock circuit 351. As a result, at the occurrence of the detection informing signal Dw, the trigger pulse circuit 322 shifts or changes the subsequent occurrence timing of the trigger pulse signal Ar. The trigger pulse signal Ar of the dividing circuit 352 is a pulse signal that becomes "H" for a predetermined short time.

The PWM pulse circuit 323 comprises a flip-flop circuit 361, an invert circuit 362 and an AND circuit 363. The flip-flop circuit 361 becomes "H" at the occurrence of the rising edge of the trigger pulse signal Ar, and becomes "L" at the occurrence of the rising edge of the compared signal Ap. The inverted signal of the trigger pulse signal Ar and the output pulse signal W1 of the flip-flop circuit 361 are composed by the AND circuit 363, thereby producing the switching pulse signal Wp (PWM pulse signal). Hence, the switching pulse signal Wp of the PWM pulse circuit 323 is "L" when the trigger pulse signal Ar is "H." The switching pulse signal Wp changes to "H" at the falling edge of the trigger pulse signal Ar, and changes to "L" at the rising edge of the compared signal Ap.

Figure 16:
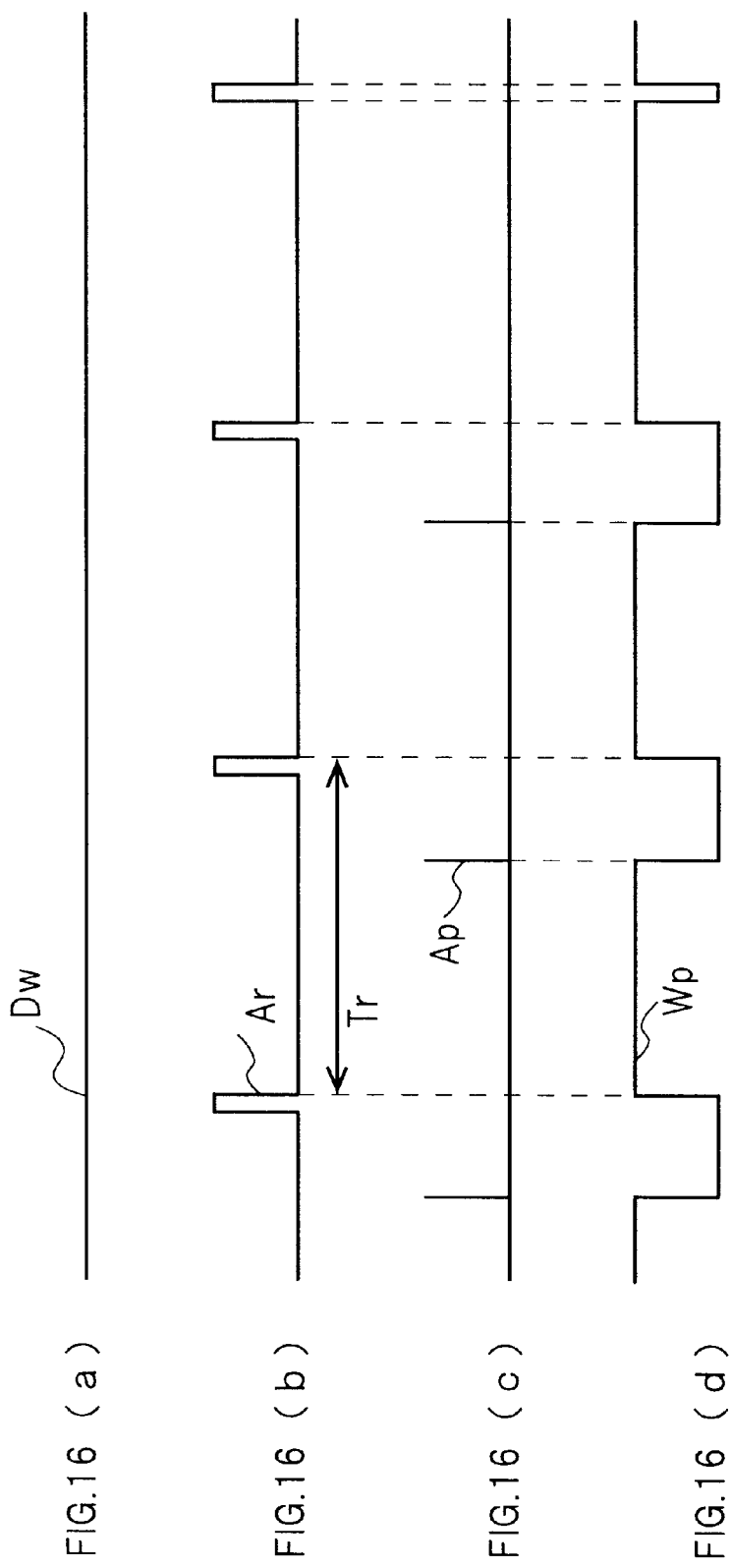
FIG. 16 is a waveform diagram illustrating the operation of the switching control part 22 in accordance with the embodiment 1.

The parts (a) to (d) of FIG. 16 show the signal relationship among the trigger pulse signal Ar, the compared signal Ap and the switching pulse signal Wp in the case that the detection informing signal Dw is "L." The switching pulse signal Wp becomes "H" at the falling edge of the trigger pulse signal Ar, and becomes "L" at the rising edge of the compared signal Ap. In this way, the switching pulse signal Wp becomes a PWM signal responding with the comparison result between the current-detection signal Ad and the command signal Ac. In addition, when the compared signal Ap is not generated in one period of the trigger pulse signal Ar, the switching pulse signal Wp becomes "L" in the "H" period of the trigger pulse signal Ar. In other words, the switching pulse signal Wp becomes "L" for at least a predetermined time (a time width during which Ar is "H") periodically or nearly periodically in synchronization with the occurrence of the trigger pulse signal Ar. The frequency of the switching pulse signal Wp is set at about 50 kHz in the embodiment 1, but the frequency is preferably selected from the range of 20 kHz to 200 kHz, for example.

Furthermore, the parts (a) to (d) of FIG. 17 show the signal relationship among the detection informing signal Dw, the trigger pulse signal Ar, the compared signal Ap and the switching pulse signal Wp in the case that the detection informing signal Dw occurres. Because of the occurrence of the detection informing signal Dw, the subsequent timing of the trigger pulse signal Ar is shifted or changed. The timing of the trigger pulse signal Ar just after the occurrence of the detection informing signal Dw is shifted or changed herein so that the trigger pulse signal Ar is generated after a time Tw from the occurrence of the detection informing signal Dw. The subsequent trigger pulse signal Ar is generated at every predetermined time interval Tr. Since the switching pulse signal Wp becomes "H" at the falling edge of the trigger pulse signal Ar and becomes "L" at the rising edge of the compared signal Ap, the switching pulse signal Wp is a PWM signal responding with the current-detection signal Ad and the command signal Ac, and the timing of the switching pulse signal Wp is shifted or changed in response to the occurrence of the detection informing signal Dw. As a result, the timing of the high-frequency switching operation of the power transistors of the power supplying part 20 responding with the switching pulse signal Wp is shifted or changed in response to the detection informing signal Dw.

The comprehensive operation and advantages of the embodiment 1 will be described below.

The state shifting part 35 (comprising the adjusting part 27 and the shift hold part 31) and the activation control part 32 constitute the activation operation block 41. The activation control part 32 outputs the low-side activation control signals M1, M2 and M3 and the high-side activation control signals N1, N2 and N3 in response to the low-side period signals P1, P2 and P3 and the high-side period signals Q1, Q2 and Q3 of the state shifting part 35, thereby selecting the windings to be activated. The low-side power transistors 101, 102 and 103 and the high-side power transistors 105, 106 and 107 of the power supplying part 20 become ON or OFF in response to the low-side activation control signals M1, M2 and M3 and the high-side activation control signals N1, N2 and N3 of the activation control part 32, respectively. As a result, the power supplying part 20 supplies a power to the three-phase windings 12, 13 and 14.

The switching operation block 42 comprising the switching control part 22 and the current detecting part 21 produces the switching pulse signal Wp so as to supply the PWM pulse drive voltages V1, V2 and V3 to the three-phase windings 12, 13 and 14, respectively. In response to the switching pulse signal Wp of the switching control part 22, the low-side activation control signals M1, M2 and M3 of the activation control part 32 become PWM pulse signals. One or two of the low-side power transistors, which are selected by the low-side activation control signals M1, M2 and M3 of the activation control part 32, perform ON-OFF high-frequency switching simultaneously. The low-side power transistors 101, 102 and 103 of the power supplying part 20 thus supply the negative parts of the drive current signals I1, I2 and I3 to the three-phase windings 12, 13 and 14, respectively. When the above-mentioned one or two of the low-side power transistors 101, 102 and 103 of the power supplying part 20 turn OFF, one or two of the high-side power diodes 105d, 106d and 107d connected to the corresponding active-phase windings are turned ON by the inductive action of the windings 12, 13 and 14, thereby supplying the negative parts of the drive current signals I1, I2 and I3 to the windings 12, 13 and 14 continuously. As a result, the drive voltages V1, V2 and V3 to the three-phase windings 12, 13 and 14 become PWM voltages. This reduces the power losses of the low-side power transistors 101, 102 and 103 of the power supplying part 20 significantly.

The high-side power transistors 105, 106 and 107 of the power supplying part 20 supply the positive parts of the drive current signals I1, I2 and I3 to the three-phase windings 12, 13 and 14, respectively. One or two of the high-side power transistors, which are selected by the high-side activation control signals N1, N2 and N3 of the activation control part 32, are turned ON simultaneously (while do not performing PWM operation), and supply the positive parts of the drive current signals I1, I2 and I3 to the windings 12, 13 and 14. As a result, in accordance with the rotation of the disk 1 or the rotor 11, the three-phase bi-directional drive current signals I1, I2 and I3, alternating in the positive and negative directions, are supplied to the three-phase windings 12, 13 and 14, respectively. In addition, this reduces the power losses of the high-side power transistors 105, 106 and 107 of the power supplying part 20 significantly.

The current detecting part 21 detects the composed supply current Ig to the three-phase windings 12, 13 and 14 from the voltage supplying part 25, and outputs the current-detection signal Ad. The composed supply current Ig corresponds to the composite value of the negative parts of the three-phase drive current signals I1, I2 and I3 to the three-phase windings 12, 13 and 14. The switching control part 22 compares the current-detection signal Ad with the command signal Ac, and outputs the switching pulse signal Wp responding with the comparison result. The low-side power transistors 101, 102 and 103 of the power supplying part 20 execute ON-OFF high-frequency switching in response to the switching pulse signal Wp. As a result, the composed supply current Ig is controlled in response to the command signal Ac. Consequently, the drive current signals I1, I2 and I3 to the three-phase windings 12, 13 and 14 can be controlled accurately in response to the command signal Ac, and the pulsation of the generated drive force can be reduced. In addition, the low-side power transistors 101, 102 and 103 of the power supplying part 20 perform ON-OFF high-frequency switching simultaneously in response to the switching pulse signal Wp (a single pulse signal) from the switching control part 22; and thereby the configuration of the apparatus is made very simple. Furthermore, the high-side power transistors 105, 106 and 107 of the power supplying part 20 do not perform PWM operation (high-frequency switching operation) but perform only ON-OFF operation. Therefore, the ON-OFF operation of the high-side transistors is carried out very easily.

The voltage detecting part 23 compares the three-phase drive voltages V1, V2 and V3 with the common voltage Vc or the composed common voltage Vcr. The compared pulse signals obtained as the result of the comparison are selected in response to the low-side period signals P1, P2 and P3 and/or the high-side period signals Q1, Q2 and Q3, for example. As a result, the voltage detecting part 23 outputs the detected pulse signal Dt, the speed pulse signal Dp and the detecting informing signal Dw responding with the terminal voltages of the windings. In other words, the voltage detecting part 23 produces the detected pulse signal Dt, the speed pulse signal Dp and the detecting informing signal Dw, which respond with the counter electromotive forces induced in the three-phase windings 12, 13 and 14 in accordance with the rotation of the rotor 11. In addition, since the power transistors of the power supplying part 20 perform high-frequency switching in response to the switching pulse signal Wp (a single pulse signal), the signal selecting circuit 155 of the voltage detecting part 23 easily prohibits the detection of the terminal voltages in very short periods including the changing edges of the switching pulse signal Wp, thereby eliminating the influence of the switching noises owing to the high-frequency switching of the power transistors. Furthermore, the signal selecting circuit 155 of the voltage detecting part 23 prohibits the detection of the terminal voltages in periods including the alteration periods of the current paths to the windings, thereby preventing an improper detection of the terminal voltages owing to the alteration of the current paths to the windings.

The adjusting part 27 of the state shifting part 35 detects the occurrence of the rising edge of the detected pulse signal Dt. The time measuring circuit 201 of the adjusting part 27 measures the edge interval T0 of the detected pulse signal Dt. The first adjust circuit 202 produces the first timing signal F1, which is delayed from the edge of the detected pulse signal Dt by the first adjust time T1. The second adjust circuit 203 produces the second timing signal F2, which is delayed from the edge of the detected pulse signal Dt by the second adjust time T2. The first adjust time T1 and the second adjust time T2 are responding with the interval time T0 of the detected pulse signal Dt, and these times have a relationship of T1<T2<T0.

The shift hold part 31 of the state shifting part 35 shifts its holding state from a first state to a second state in response to the first timing signal F1, and one of the low-side period signals and the high-side period signals becomes activated ("H"). Furthermore, the shift hold part 31 further shifts its holding state from the second state to a third state in response to the second timing signal F2, and one of the low-side period signals and the high-side period signals becomes deactivated ("L"). The shift hold part 31 shifts the holding state cyclically in sequence to one of the 12 holding states at every occurrence of the first timing signal F1 and the second timing signal F2. The low-side period signals P1, P2 and P3 determine the active periods of the low-side power transistors 101, 102 and 103, respectively. The high-side period signals Q1, Q2 and Q3 determine the active periods of the high-side power transistors 105, 106 and 107, respectively.

The low-side activation circuit 250 of the activation control part 32 composes the low-side period signals P1, P2 and P3 of the shift hold part 31 and the switching pulse signal Wp of the switching control part 22, and produces the low-side activation control signals M1, M2 and M3. The low-side power transistors 101, 102 and 103 of the power supplying part 20 execute ON-OFF high-frequency switching responding with the low-side activation control signals M1, M2 and M3, respectively. Therefore, the power losses of the low-side power transistors can be reduced significantly, and the heat generation is also improved.

The high-side activation circuit 251 of the activation control part 32 produces the high-side activation control signals N1, N2 and N3 responding with the high-side period signals Q1, Q2 and Q3 of the shift hold part 31 through the buffer circuits. The high-side power transistors 105, 106 and 107 of the power supplying part 20 execute ON-OFF operation responding with the high-side activation control signals N1, N2 and N3, respectively. Therefore, the power losses of the high-side power transistors 105, 106 and 107 can be reduced significantly, and the heat generation is also improved.

The commanding part 26 detects the rotational speed of the disk 1 or the rotor 11 by using the speed pulse signal Dp of the voltage detecting part 23, and produces the command signal Ac in response to the speed pulse signal Dp. When the disk 1 or the rotor 11 is controlled to rotate at the aimed rotational speed, the command signal Ac becomes a small value. As a result, the small drive current signals I1, I2 and I3 proportional to the command signal Ac are supplied to the windings 12, 13 and 14 while the low-side power transistors 101, 102 and 103 of the power supplying part 20 execute high-frequency switching in response to the command signal Ac.

The adjusting part 27 of the state shifting part 35 produces the first timing signal F1 delayed by the first adjust time T1 and the second timing signal F2 delayed by the second adjust time T2. Each of the active periods (the active electrical angles) of the low-side period signals P1, P2 and P3 and the high-side period signals Q1, Q2 and Q3 becomes considerably larger than an electrical angle of 360/3=120 degrees. Therefore, each of the active periods of the low-side power transistors 101, 102 and 103 and the high-side power transistors 105, 106 and 107 becomes considerably larger than 120 degrees, and the pulsation of the generated drive force can be reduced. Hence, the vibration and the acoustic noise of the disk 1 are remarkably reduced. In the embodiment 1, the active periods of the low-side period signals P1, P2 and P3 and the high-side period signals Q1, Q2 and Q3 are set at 130 degrees or more.

Furthermore, the switching control part 22 shifts or changes the timing of the switching pulse signal Wp in response to the occurrence of the detection informing signal Dw of the voltage detecting part 23. This changes the PWM timing of the power transistors of the power supplying part 20. As a result, the switching part 22 can prevent the occurrence of the switching edges of the switching pulse signal Wp at the next detection timing of the detected pulse signal Dt, thereby performing an accurate detection of the terminal voltages. In other words, the voltage detecting part 23 can detect the detected pulse signal Dt and the speed pulse signal Dp accurately, and the above-mentioned operation becomes very stable. Hence, the rotational speed of the disk 1 can be controlled stably with little jitter (little speed fluctuation).

Next, the reasons why high-frequency switching operation can be prevented from occurring at the detection timing and accurate terminal voltage detection can be performed will be described below.

Since the rotational speed of the disk 1 and the rotor 11 is controlled constant in the speed controlled state, the time interval T0 (the detection time interval of the terminal voltages) between the rising edges of the detected pulse signal Dt becomes constant or nearly constant. This time interval T0 is shown in FIG. 13. On the other hand, the switching control part 22 produces the switching pulse signal Wp at the time interval Tr of the trigger pulse signal Ar in the case of the detection informing signal Dw="L". This time interval Tr is shown in FIG. 16. Since the switching control part 22 shifts or changes the occurrence timing of the trigger pulse signal Ar after time Tw from the occurrence of the detection informing signal Dw, the occurrence timing of the subsequent trigger pulse signal Ar can be shifted and changed (see FIG. 17). Hence, the trigger pulse signal Ar is generated at specific timing starting from the occurrence of the detection informing signal Dw, and the occurrence timing of the switching pulse signal Wp is shifted or changed. The power transistors of the power supplying part 20 perform high-frequency switching responding with the switching pulse signal Wp. As a result, by changing the timing of the trigger pulse signal Ar responding with the detection informing signal Dw, the switching control part 22 can prevent the switching of the switching pulse signal Wp (the power transistors) at the timing when the next occurrence of the detected pulse signal Dt is expected. Therefore, the voltage detecting part 23 can execute an accurate detection of the terminal voltages without the influence of the switching noises, and produce the detected pulse signal Dt accurately.

In one actual case, Tn=T0/Tr is set at an appropriate non-integer value (Tn=an integer+0.1 to 0.5), and Tw in FIG. 17 is set at Tr or nearly Tr (0.8 Tr to 1.2 Tr), for example. Then, the timing when the next detection of the detected pulse signal is expected can be in a period when the power transistors of the power supplying part 20 are in the ON state while the power transistors execute high-frequency switching. As a result, the voltage detecting part 23 can execute the accurate detection of the terminal voltages without the influence of the switching noises, thereby producing the accurate and precise detected pulse signal Dt.

In another actual case, Tn=T0/Tr is set at an integer or nearly an integer, and Tw is set at an appropriate value between 0.2 Tr and 0.8 Tr (Tw=0.2 Tr to 0.8 Tr), for example. Then, the timing when the next detection of the detected pulse signal is expected can be in a period when the power transistors of the power supplying part 20 are in the ON state while the power transistors execute high-frequency switching. As a result, the voltage detecting part 23 can execute the accurate detection of the terminal voltages without the influence of the switching noises, thereby producing the accurate and precise detected pulse signal Dt. Furthermore, by setting Tn at an integer or nearly an integer, the changing amount of the switching timing responding with the occurrence of the detected pulse signal Dt is reduced. As a result, the periodic fluctuation of the switching pulse signal Wp is reduced, and the pulsation of the drive current signals is also reduced. In the present invention, the specific values of Tn and Tw are not limited to the above-mentioned examples.

In the embodiment 1, as understood from the above-mentioned descriptions, no position detecting element for detecting the rotational position of the rotor 11 is necessary by detecting the terminal voltages of the windings, thereby simplifying the configuration.

Furthermore, the power transistors execute ON-OFF high-frequency switching so as to supply the bi-directional drive current signals to the windings 12, 13 and 14, thereby reducing the power losses of the power transistors drastically. In other words, the low-side power transistors 101, 102 and 103 execute ON-OFF high-frequency switching, thereby reducing the power losses of the low-side power transistors significantly. The high-side power transistors 105, 106 and 107 alter current paths by turning ON and OFF, thereby reducing the power losses of the high-side power transistors 105, 106 and 107 significantly. As a result, the power losses of the power transistors are reduced drastically, and the heat generation of the disk drive apparatus is also reduced significantly.

Furthermore, in the embodiment 1, the timing of the high-frequency switching operation of the power transistors of the power supplying part 20 is shifted or changed in response to the occurrence of the detected pulse signal of the voltage detecting part. Hence, the voltage detecting part can execute accurate terminal voltage detection without the influence of the switching noises. As a result, the alteration of the current paths becomes accurate responding with the detected pulse signal Dt of the voltage detecting part, and the fluctuation of the generated drive force is reduced, thereby performing stable rotation of the disk and/or the rotor without using position detecting elements. Moreover, the voltage detecting part 23 produces the speed pulse signal Dp responding with the detected pulse signal Dt, and the rotational speed of the disk and/or rotor is controlled stably and precisely responding with the speed pulse signal Dp or the detected pulse signal Dt, thereby performing accurate and stable speed control operation without using speed detecting elements. In other words, jitter (speed fluctuation) of the disk rotation can be reduced remarkably. Therefore, an excellent disk drive apparatus for reproducing and/or recording on a high-density disk can be realized without position and speed detecting elements.

The speed pulse signal is not limited to a frequency-divided signal of the detected pulse signal, but the detected pulse signal can be used directly as the speed pulse signal. Furthermore, the high-frequency switching timing of the power transistors of the power supplying part 20 can be shifted or changed by changing the time interval Tr of the trigger pulse signal in response to the occurrence of the detected pulse signal of the voltage detecting part 23. These are also included in the present invention.

Furthermore, in the embodiment 1, one or two of the three low-side power transistors 101, 102 and 103 execute ON-OFF high-frequency switching so as to attain a first switching operation for switching one low-side power transistor and a second switching operation for switching two low-side power transistors. The first switching operation and the second switching operation are alternated in accordance with the rotation of the rotor. Hence, the conductions of the low-side power transistors are overlapped in the alteration of the current paths, and the pulsation of the generated drive force for rotating the disk 1 is reduced, thereby reducing vibration and acoustic noise of the disk 1 remarkably. Hence, an excellent disk drive apparatus with reduced bit errors can be realized in reproducing and/or recording on a high-density disk. In the embodiment 1, the active periods (the active electrical angles) of the high-side power transistors 105, 106 and 107 and the low-side power transistors 101, 102 and 103 are set at about 140 to 160 degrees. The active periods, however, can be increased further so as to reduce vibration and acoustic noise of the disk 1.

Furthermore, in the embodiment 1, the current-detection signal responding with the supply current to the three-phase windings 12, 13 and 14 is compared with the command signal, and a single switching pulse signal is produced in response to the comparison result. One or two of the low-side power transistors execute ON-OFF high-frequency switching simultaneously in response to this single switching pulse signal. As a result, the drive current signals to the windings 12, 13 and 14 can be controlled accurately in response to the command signal by the simple switching operation. Hence, the pulsation of the drive current signals can be reduced remarkably, thereby generating an accurate drive force in response to the command signal. Moreover, it is very easy to shift or change the timing of the single switching pulse signal in response to the occurrence of the detected pulse signal, thereby simplifying the configuration significantly. In other words, it is easily possible to eliminate the influence of PWM noises in detecting the terminal voltages of the windings 12, 13 and 14.

Furthermore, in the PWM pulse circuit 323 of the switching control part 22, the switching pulse signal Wp becomes "L" when the trigger pulse signal Ar is "H." For this reason, each of the power transistors, being subjected to high-frequency switching operation in response to the switching pulse signal Wp, is forcibly turned OFF at every occurrence of the trigger pulse signal Ar. As a result, high-frequency switching operation is performed at every occurrence of the trigger pulse signal Ar, whereby the switching operation can be stabilized stably. In other words, the ON periods of the power transistors in high-frequency switching become nearly uniform, and the detection of the terminal voltages of the windings 12, 13 and 14 becomes stable.

Figure 18:
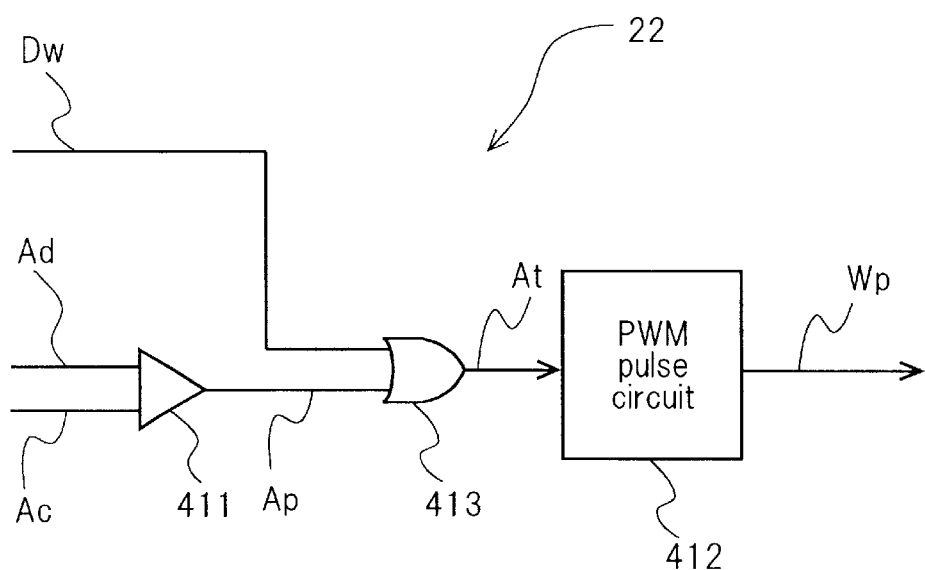
FIG. 18 is another circuit diagram of the switching control part in accordance with the embodiment 1.

Besides, the switching control part 22 having another configuration shown in FIG. 18 is replaceable to that shown in FIG. 10, for example, and will be described hereinbelow. The switching control part 22 comprises a comparing circuit 411, a PWM pulse circuit 412 and an OR circuit 413. The comparing circuit 411 compares the current-detection signal Ad with the command signal Ac, and changes its compared signal Ap to "H" when the current-detection signal Ad becomes larger than the command signal Ac. The OR circuit 413 composes the compared signal Ap with the detection informing signal Dw and outputs an output signal At as a trigger signal to the PWM pulse circuit 412. The switching pulse signal Wp (PWM pulse signal Wp) of the PWM pulse circuit 412 becomes "L" in a predetermined time Tf just after every occurrence of the rising edges of the output signal At of the OR circuit 413. After the predetermined time Tf has passed, the switching pulse signal Wp changes to "H".

Figure 19:
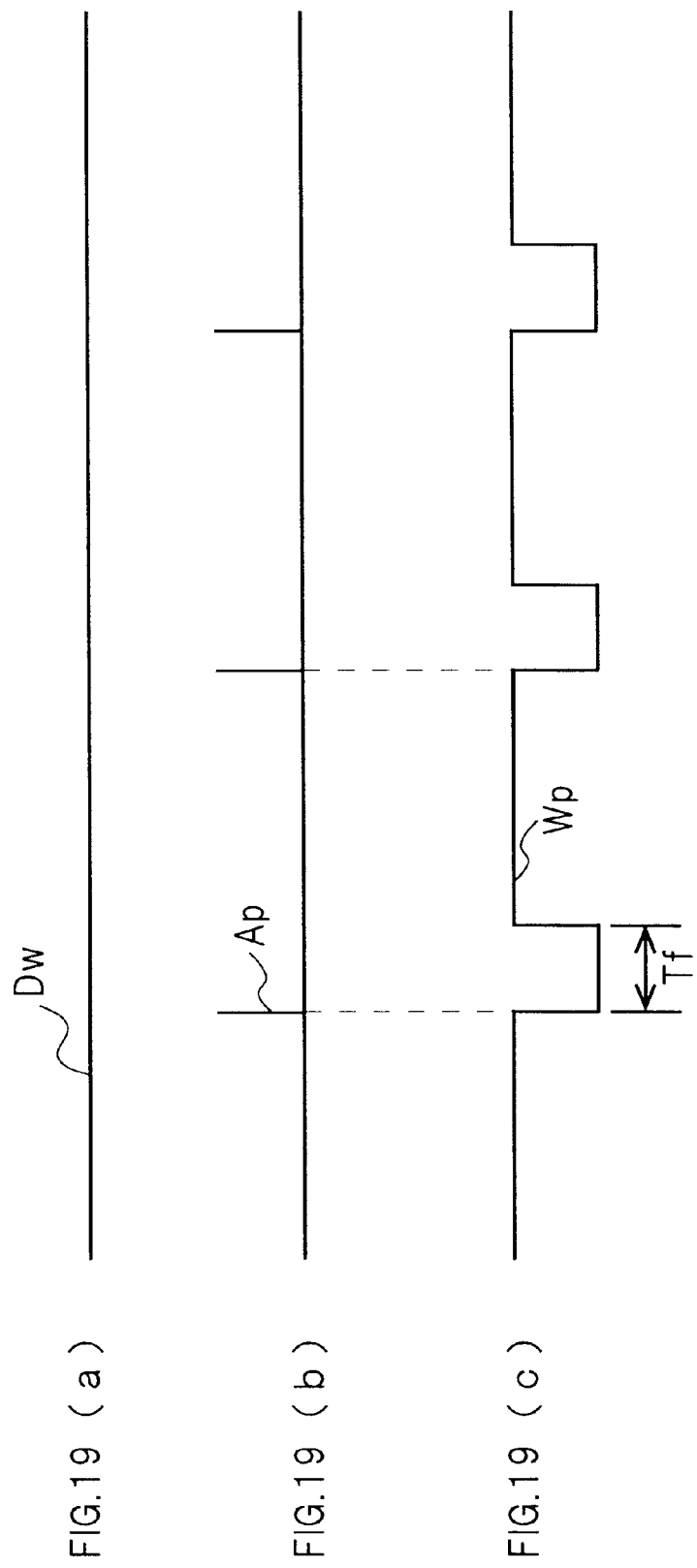
FIG. 19 is a waveform diagram illustrating the operation of the switching control part shown in FIG. 18 in accordance with the embodiment 1.

The parts (a) to (c) of FIG. 19 show the relationship among the detection informing signal Dw, the compared signal Ap and the switching pulse signal Wp in the case that the detection informing signal Dw is "L". The switching pulse signal Wp shown in the part (c) of FIG. 19 becomes "L" in the predetermined time Tf just after every occurrence of the rising edges of the compared signal Ap shown in the part (b) of FIG. 19 as a trigger. After the predetermined time Tf has passed, the switching pulse signal Wp changes to "H". The compared signal Ap is "L" when the current-detection signal Ad is smaller than the command signal Ac, and it changes to "H" when the current-detection signal Ad becomes larger than the command signal Ac. The switching pulse signal Wp becomes "L" in the predetermined period Tf just after the compared signal Ap becomes "H". When the switching pulse signal Wp becomes "L", the low-side power transistors 101, 102 and 103 are deactivated. Then, the current-detection signal Ad becomes zero and the compared signal Ap becomes "L". The switching pulse signal Wp becomes "H" after the predetermined time Tf, one or two of the low-side power transistors 101, 102 and 103 become ON so as to supply a composed supply current to the three-phase windings 12, 13 and 14. In this way, the switching pulse signal Wp becomes a PWM signal (pulse width modulation signal) responding with the comparison result between the current-detection signal Ad and the command signal Ac.

Figure 20:
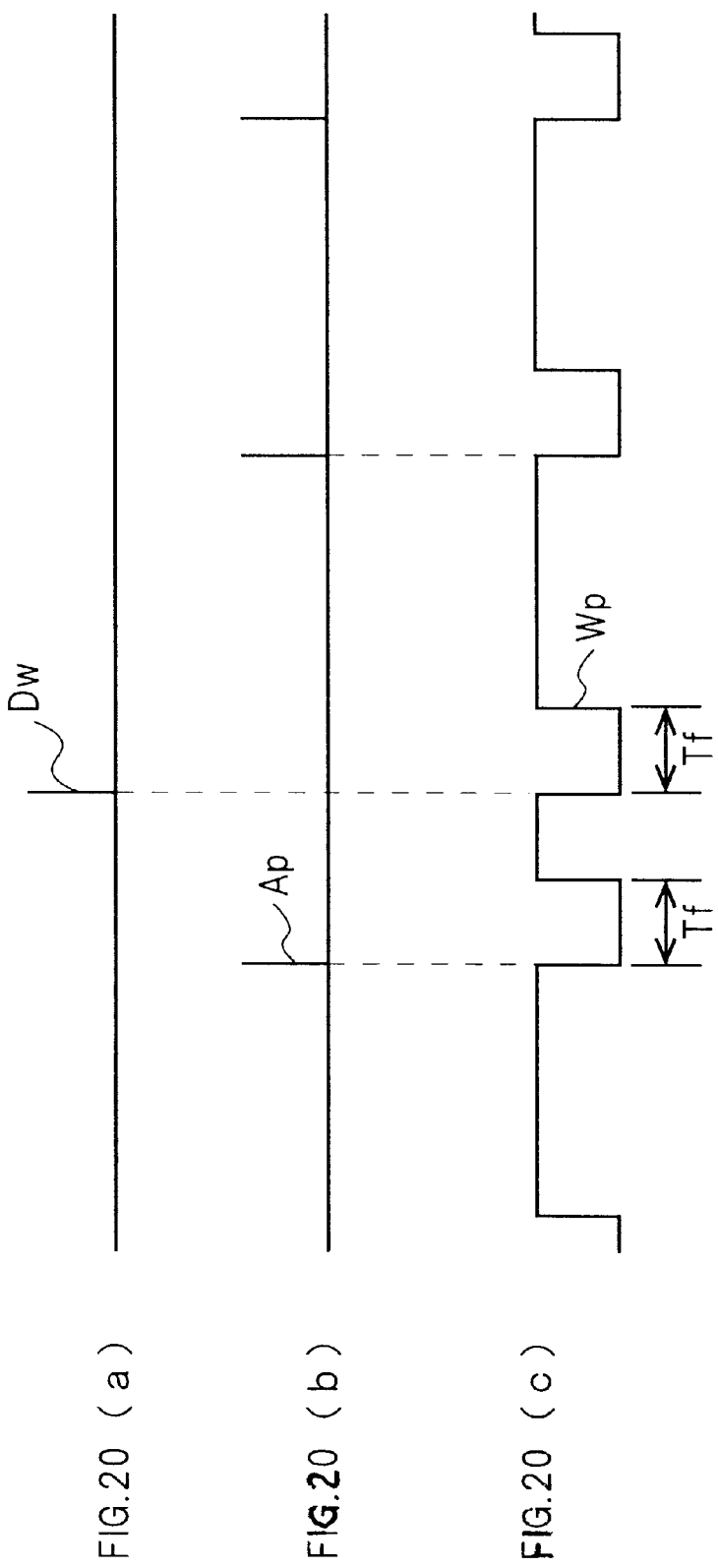
FIG. 20 is another waveform diagram illustrating the operation of the switching control part shown in FIG. 18 in accordance with the embodiment 1.

The parts (a) to (c) of FIG. 20 show the relationship among the detection informing signal Dw, the compared signal Ap and the switching pulse signal Wp in the case that the detection informing signal Dw occurs. The switching pulse signal Wp shown in the part (c) of FIG. 20 becomes "L" in the predetermined time Tf just after every occurrence of the rising edges of the detection informing signal Dw shown in the part (a) of FIG. 20 as a trigger and just after every occurrence of the rising edges of the compared signal Ap shown in the part (b) of FIG. 20 as a trigger. The switching pulse signal Wp changes to "H" after the predetermined time Tf has passed. Since the switching pulse signal Wp becomes "L" forcibly in a predetermined time at the occurrence of the detection informing signal Dw, the switching control part 22 shifts or changes the timing of the switching pulse signal Wp after the occurrence of the detection informing signal Dw. One or two of the power transistors of the power supplying part 20 execute high-frequency switching responding with the switching pulse signal Wp. In other words, the switching control part produces the switching pulse signal Wp responding with the current-detection signal Ad and the command signal Ac, and shifts or changes the switching timing of the switching pulse signal in response to the occurrence of the detection informing signal Dw.

<<Embodiment 2>>

Figure 21:
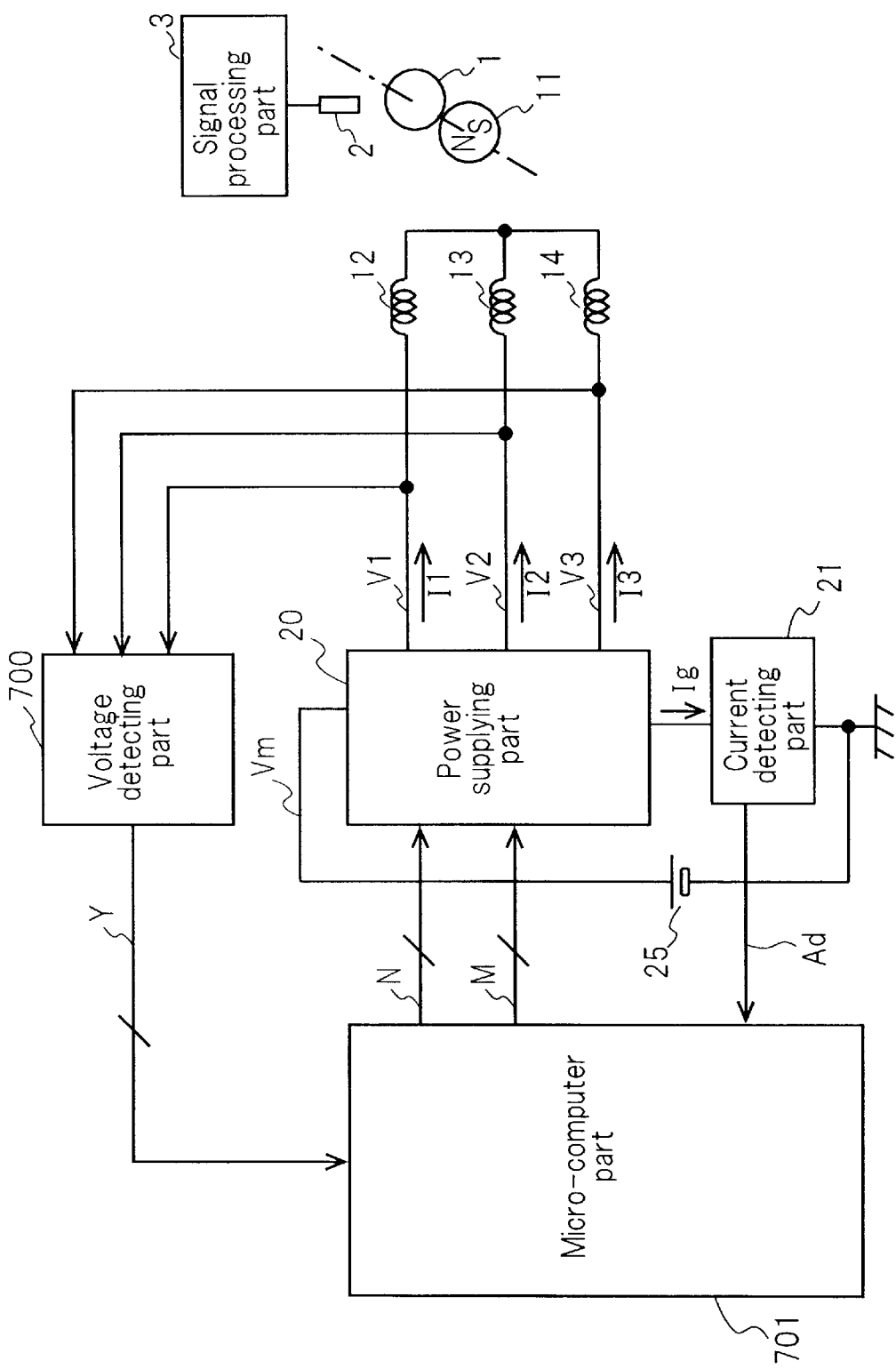
FIG. 21 is a diagram showing the configuration in accordance with embodiment 2 of the present invention.
Figure 22:
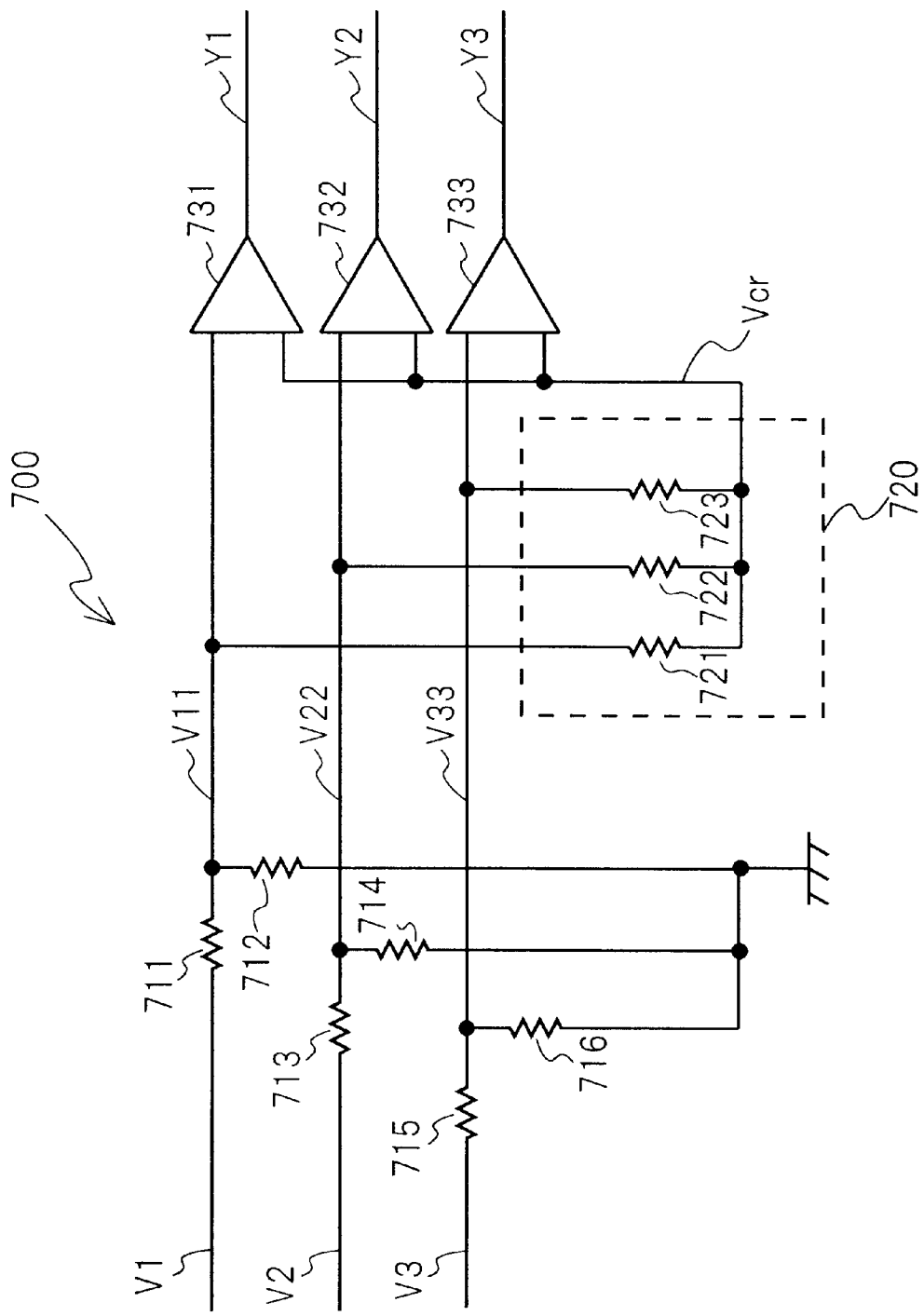
FIG. 22 is a circuit diagram of a voltage detecting part 700 in accordance with the embodiment 2.
Figure 23:
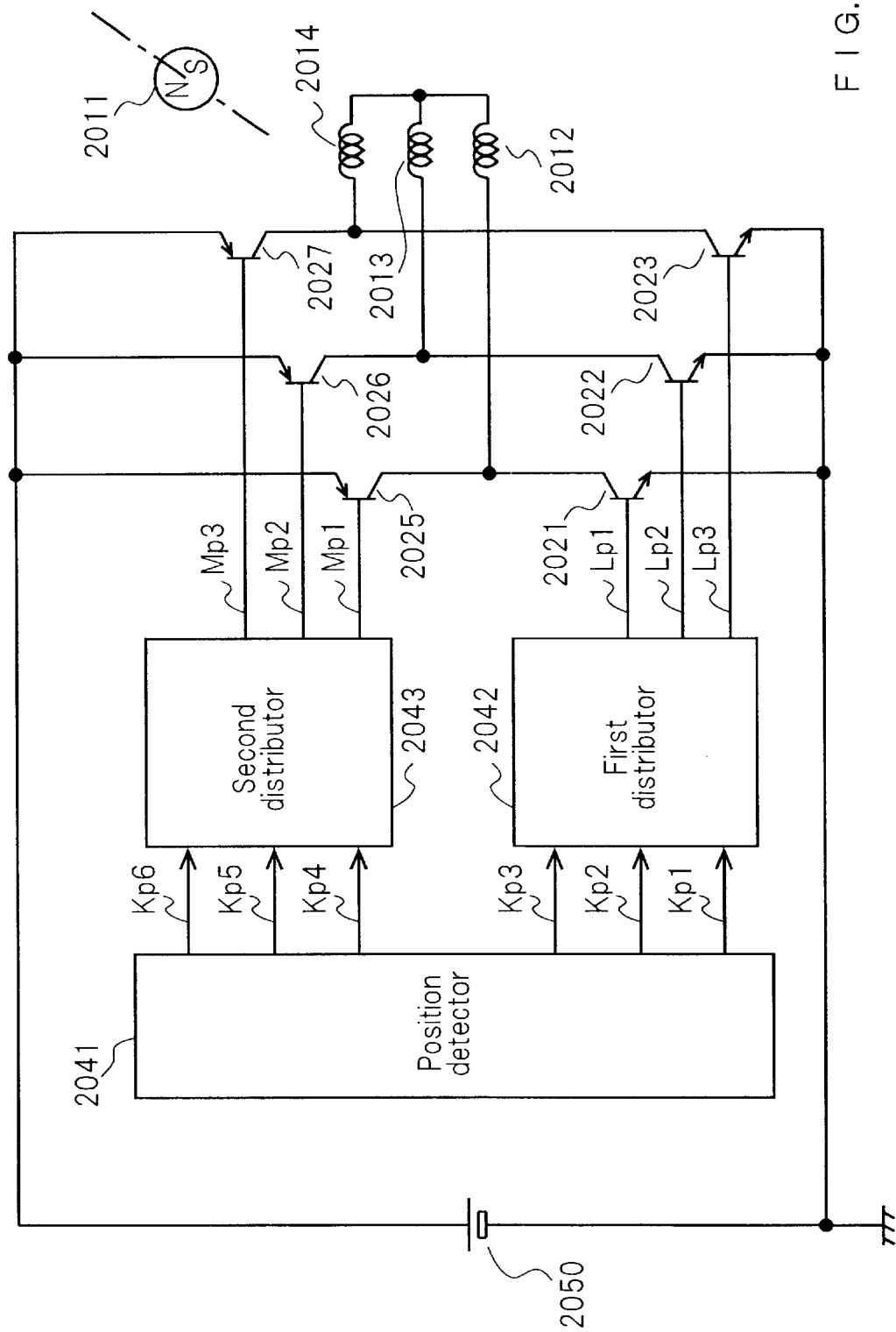
FIG. 23 is a diagram showing the configuration of the conventional motor.

FIGS. 21 and 22 show a motor and a disk drive apparatus including the motor in accordance with embodiment 2 of the present invention. FIG. 21 shows a comprehensive configuration of the disk drive apparatus in accordance with embodiment 2. In this embodiment, the functions of the adjusting part, the shift hold part, the activation control part, the switching control part and the commanding part of the above-mentioned embodiment 1 are included in the hardware and software of a micro-computer part 701. The parts or circuits having functions and configurations similar to those of the above-mentioned embodiment 1 are designated by the same numerals, and their explanations are abbreviated.

In accordance with the rotation of the disk 1 or the rotor 11, the power supplying part 20 alters current paths to the three-phase windings 12, 13 and 14. A voltage detecting part 700 detects the terminal voltages of the three-phase windings 12, 13 and 14, and outputs compared pulse signals Y1, Y2 and Y3 responding with the terminal voltages to the micro-computer part 701. FIG. 22 shows a configuration of the voltage detecting part 700.

In FIG. 22, the voltage detecting part 700 divides by using resistors 711 to 716 the terminal voltages V1, V2 and V3 of the windings 12, 13 and 14, thereby producing divided terminal voltages V11, V22 and V33. A composite voltage circuit 720 composes the divided terminal voltages V11, V22 and V33 by using resistors 721, 722 and 723, and produces a composite common voltage Vcr. Comparator circuits 731, 732 and 733 compare the divided terminal voltages V11, V22 and V33 with the composite common voltage Vcr, respectively, and output the compared pulse signal Y1, Y2 and Y3 responding with the comparison results.

The micro-computer part 701 of FIG. 21 receives the compared pulse signals Y1, Y2 and Y3 of the voltage detecting part 700. The micro-computer part 701 then detects rising and falling edges of the compared pulse signals corresponding to the state of activation to the windings 12, 13 and 14 while eliminating the influence of PWM noise in the compared pulse signals, and substantially produces a detected pulse signal. In response to this detecting operation for the detected pulse signal, the micro-computer part 701 substantially produces the first timing signal delayed by the first adjust time and the second timing signal delayed by the second adjust time from the occurrence timing of the detected pulse signal, and substantially shifts the holding state responding with the first timing signal and the second timing signal. In accordance with the holding state, the active periods of the low-side activation control signals M1, M2 and M3 and the high-side activation control signals N1, N2 and N3 are substantially determined. In addition, the micro-computer part 701 receives the current-detection signal Ad of the current detecting part 21 as a digital current-detection signal through an AD conversion, and substantially compares the digital current-detection signal with a digital command signal. The micro-computer part 701 substantially produces the switching pulse signal responding with the comparison result, and produces the above-mentioned low-side activation control signals M1, M2 and M3 responding with the switching pulse signal. The low-side activation control signals M1, M2 and M3 of the micro-computer part 701 are supplied to the power supplying part 20, and the low-side power transistors of the power supplying part 20 execute ON-OFF high-frequency switching responding with the low-side activation control signals M1, M2 and M3, respectively. The high-side activation control signals N1, N2 and N3 of the micro-computer part 701 are supplied to the power supplying part 20, and the high-side power transistors of the power supplying part 20 execute ON-OFF operation responding with the high-side activation control signals N1, N2 and N3, respectively. The micro-computer part 701 substantially detects the rotational speed of the disk 1 or the rotor 11 in response to the compared pulse signals of the voltage detecting part 700, and produces the command signal responding with the difference between the rotational speed and the aimed rotational speed. Besides, the current-detection signal Ad can be compared with the command signal Ac in an analogue manner.

The micro-computer part 701 changes the timing of the switching pulse signal in response to the occurrence timing of the detected pulse signal. Hence, it is possible to prevent the occurrence of the switching of the switching pulse signal near the next detection timing of the detected pulse signal while one or two of the low-side power transistors execute high-frequency switching. Therefore, the influence of the switching noises can be reduced, whereby it is possible to produce the detected pulse signal accurately responding with the terminal voltages of the windings 12, 13 and 14.

The embodiment 2 has many advantages similar to those of the above-mentioned embodiment 1. Besides, some operations of the software of the micro-computer part 701 in the above-mentioned embodiment 2 can be executed by using hardware of the micro-computer 701.

The configurations of the above-mentioned embodiments according to the prevent invention can be modified variously. Each of the three-phase windings can be formed by connecting a plurality of winding portions in series or parallel, for example. The connection of the three-phase windings is not limited to the star connection, but the delta connection can be used. Furthermore, the number of the phases of the windings is not limited to three. Generally, it is possible to realize a configuration having windings with a plurality of phases. In addition, the number of the magnetic poles in the field part of the rotor is not limited to two, but multi-poles can be used in the field part.

In the above-mentioned embodiments, the current detecting part is fabricated by a single current detecting resistor. The present invention, however, is not limited to such a configuration. The present invention can have a configuration wherein a composed supply current of the negative parts of the three-phase drive currents is detected or a composed supply current of the positive parts of the three-phase drive currents is detected. Furthermore, each of the low-side FET power transistors and the high-side FET power transistors can have multiple output terminals, and the current output to one of the multiple output terminals can be detected. Still further, it is possible to have a configuration without a current detecting part.

In the above-mentioned embodiments, FET power transistors are used as the power transistors of the power supplying part so as to make high-frequency switching operation easy. With this configuration, the power losses and heat generation of the power transistors are reduced remarkably, and the FET power transistors can be easily formed into an one-chip IC (integrated circuit) together with other electronic components such as transistors, resistors, and diodes. The present invention, however, is not limited to this kind of configuration. Bipolar transistors or IGBT transistors can be used as the power transistors, for example.

The above-mentioned embodiments are configured so that the voltage detecting part detects the terminal voltages of the power supplying terminals of the windings. The present invention, however, is not limited to such a configuration, and the voltage detecting part may detect the terminal voltage of the common terminal of the windings.

In the above-mentioned embodiments, the power transistors of the power supplying part 20 execute high-frequency switching between a full-ON state and an OFF state. Generally, the power losses of the power transistors can be reduced remarkably by executing high-frequency switching of the power transistors between an ON state (full-ON state or half-ON state) and an OFF state.

In the above-mentioned embodiments, although only the low-side power transistors execute high-frequency switching, the present invention is not limited to such a configuration. Only the high-side power transistors can execute high-frequency switching operation, the low-side power transistors and the high-side power transistors can execute high-frequency switching operation, or the low-side power transistors and the high-side power transistors can execute high-frequency switching operation alternately at differential periods.

Still further, the present invention is not limited to a configuration wherein a plurality of power transistors execute ON-OFF high-frequency switching simultaneously in response to a single switching pulse signal. The present invention may have a configuration wherein three pairs of the low-side power transistors and the high-side power transistors are subjected to high-frequency switching in response to three-phase switching pulse signals, respectively.

The high-side power transistors in phase with the low-side power transistors executing ON-OFF high-frequency switching can execute complementary OFF-ON high-frequency switching. In this case, the power losses of the high-side power diodes can be reduced, and the heat generation of the disk drive apparatus can be reduced further. Since the low-side power transistors of the power supplying part execute the high-frequency switching in response to a single pulse signal, the high-side power transistors can easily execute complementary OFF-ON high-frequency switching.

Although the above-mentioned embodiments show motors for disk drive apparatuses, the motors are usable to many other apparatus, such as an office automation apparatus or an audio-visual apparatus, for example.

Still further, the configuration of the present invention can be modified variously without departing from the purpose of the present invention. It is needless to say that such modifications can be included in the present invention.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A disk drive apparatus comprising:

head means for at least reproducing a signal from a disk or recording a signal on a disk;

processing means for at least processing an output signal from said head means and outputting a reproduced signal or processing a signal and outputting a recording signal into said head means;

a rotor, having a field part which generates field fluxes, for driving said disk;

Q-phase windings (Q is an integer of 3 or more);

voltage supply means, including two output terminals, for supplying a DC voltage;

power supply means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal responding with terminal voltages of said Q-phase windings, for producing a speed pulse signal which corresponds to a rotational speed of said disk and for producing a detection informing signal at an edge of the detected pulse signal;

activation operation means for controlling active periods of said Q first power transistors and said Q second power transistors responding with said detected pulse signal of said voltage detecting means, each of said active periods being an electrical angle which is larger than 360/Q degrees;

commanding means for producing a command signal responding with said speed pulse signal; and switching operation means for producing a switching pulse signal corresponding to said command signal, causing at least one power transistor among said Q first power transistors and said Q second power transistors to perform high-frequency switching responding with said switching pulse signal so that the rotational speed of said disk is controlled responding with said speed pulse signal, and changing a timing of said switching pulse signal responding with each occurrence timing of detection of said detection informing signal from said voltage detecting means.

2. The disk drive apparatus in accordance with claim 1, wherein
said switching operation means causes one or two of Q first power transistors to perform high-frequency switching simultaneously responding with said switching pulse signal.

3. The disk drive apparatus in accordance with claim 1, wherein
said switching operation means comprises:
current detecting means for producing a current-detection signal responding with or corresponding to a composed supply current from said voltage supplying means to said Q-phase windings, and
switching control means for comparing said current-detection signal with said command signal, producing said switching pulse signal responding with the comparison result, and changing a timing of said switching pulse signal responding with detection of said detected pulse signal.

4. The disk drive apparatus in accordance with claim 1, wherein
said switching operation means controls the peak of the composed current from said voltage supplying means to said Q-phase windings responding with said command signal.

5. The disk drive apparatus in accordance with claim 1, wherein
voltage detecting means produces said detected pulse signal responding with comparison result of the terminal voltages of said Q-phase windings.

6. The disk drive apparatus in accordance with claim 1, wherein
said activation operation means comprises:
state shifting means for shifting a holding state from one state to at least one other state in sequence responding with said detected pulse signal of said voltage detecting means;
activation control means for controlling the active periods of said Q first power transistors and said Q second power transistors responding with said holding state.

7. The disk drive apparatus in accordance with claim 6, wherein
said state shifting means shifts said holding state from a first state to a second state after a first adjust time from detection of said detected pulse signal, and further shifts said holding state from the second state to a third state after a second adjust time from detection of said detected pulse signal, said second adjust time being larger than said first adjust time.

8. The disk drive apparatus in accordance with the claim 7, wherein
said state shifting means produces said first adjust time and said second adjust time which are substantially proportional to an interval of said detected pulse signal.

9. The disk drive apparatus in accordance with claim 1, wherein
said commanding means produces said command signal responding with an output pulse signal of said voltage detecting means.

10. A disk drive apparatus comprising:
head means for at least reproducing a signal from a disk or recording a signal on said disk;
processing means for at least processing an output signal from said head means and outputting a reproduced signal, or processing a signal and outputting a recording signal into said head means;
a rotor having a field part which generates field fluxes, for driving said disk;
Q-phase windings (Q is an integer of 3 or more);
voltage supplying means, including two output terminals, for supplying a DC voltage;
power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;
voltage detecting means for producing a detected pulse signal responding with terminal voltages of said Q-phase windings, for producing a speed pulse signal which corresponds to a rotational speed of said disk and for producing a detection informing signal at an edge of the detected pulse signal;
activation operation means for controlling active periods of said Q first power transistors and said Q second power transistors responding with said detected pulse signal of said voltage detecting means, each of said active periods being an electrical angle which is larger than 360/Q degrees;
commanding means for producing a command signal responding with said speed pulse signal; and
switching operation means including:
current detecting means for producing a current-detection signal responding with or corresponding to a composed supply current from said voltage supplying means to said Q-phase windings, and
switching control means for producing a switching pulse signal responding with said current-detection signal and said command signal, causing at least one power transistor among said Q first power transistors and said Q second power transistors to perform high-frequency switching responding with said switching pulse signal so that the rotational speed of said disk is controlled responding with said speed pulse signal, and changing a timing of said switching pulse signal responding with each occurrence timing of detection of said detection informing signal.

11. The disk drive apparatus in accordance with claim 10, wherein
said switching operation means causes one or two of Q first power transistors to perform high-frequency switching simultaneously responding with said switching pulse signal.

12. The disk drive apparatus in accordance with claim 10, wherein
said activation operation means comprises:
state shifting means for shifting a holding state from one state to at least one other state in sequence responding with said detected pulse signal of said voltage detecting means;
activation control means for controlling the active periods of said Q first power transistors and said Q second power transistors responding with said holding state.

13. A disk drive apparatus comprising: head means and processing means for at least reproducing a signal from a disk or recording a signal on said disk; power transistors for forming current paths to plural-phase windings so as to rotate said disk; voltage detecting means for producing a detected pulse signal responding with terminal voltages of said plural-phase windings for producing a speed pulse signal which corresponds to a rotational speed of said disk and a detection informing signal at an edge of the detected pulse signal; activation operation means for controlling active periods of said power transistors responding with said detected pulse signal; and switching operation means for producing a switching pulse signal corresponding to a command signal which responds with said speed pulse signal, causing at least one power transistor of said power transistors to perform high-frequency switching responding with said switching pulse signal so that the rotational speed of said disk is controlled responding with said speed pulse signal, and changing a timing of said switching pulse signal responding with each occurrence timing of detection of said detection informing signal.

14. The disk drive apparatus in accordance with claim 13, wherein
said switching operation means comprises:
current detecting means for producing a current-detection signal responding with or corresponding to a composed supply current to said plural-phase windings, and
switching control means for comparing said current-detection signal with said command signal, producing said switching pulse signal responding with the comparison result, and changing a timing of said switching pulse signal responding with detection of said detected pulse signal.

15. The disk drive apparatus in accordance with claim 13, wherein
said switching operation means controls the peak of the composed current to said plural-phase windings responding with said command signal.

16. The disk drive apparatus in accordance with claim 13, wherein
voltage detecting means produces said detected pulse signal responding with comparison result of the terminal voltages of said plural-phase windings.

17. The disk drive apparatus in accordance with claim 13, wherein
said activation operation means comprises:
state shifting means for shifting a holding state from one state to at least one other state in sequence responding with said detected pulse signal of said voltage detecting means;
activation control means for controlling the active periods of said power transistors responding with said holding state.

18. The disk drive apparatus in accordance with claim 17, wherein
said state shifting means shifts said holding state from a first state to a second state after a first adjust time from detection of said detected pulse signal, and further shifts said holding state from the second state to a third state after a second adjust time from detection of said detected pulse signal, said first adjust time and said second adjust time being substantially proportional to an interval of said detected pulse signal.

19. A motor comprising:
a rotor having a field part which generates field fluxes;
Q-phase windings (Q is an integer of 3 or more);
voltage supplying means, including two output terminals, for supplying a DC voltage;
power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;
voltage detecting means for producing a detected pulse signal responding with terminal voltages of said Q-phase windings, for producing a speed pulse signal which corresponds to a rotational speed of said disk and for producing a detection informing signal at an edge of the detected pulse signal;
activation operation means for controlling active periods of said Q first power transistors and said Q second power transistors responding with said detected pulse signal of said voltage detecting means, each of said active periods being an electrical angle which is larger than 360/Q degrees;
commanding means for producing a command signal responding with said speed pulse signal; and
switching operation means for producing a switching pulse signal corresponding to said command signal, causing at least one power transistor among said Q first power transistors and said Q second power transistors to perform high-frequency switching responding with said switching pulse signal so that the rotational speed of said rotor is controlled responding with said speed pulse signal, and changing a timing of said switching pulse signal responding with each occurrence timing of detection of said detection informing signal from said voltage detecting means.

20. The motor in accordance with claim 19, wherein
said switching operation means causes one or two of Q first power transistors to perform high-frequency switching simultaneously responding with said switching pulse signal.

21. The motor in accordance with claim 19, wherein
said switching operation means comprises:
current detecting means for producing a current-detection signal responding with or corresponding to a composed supply current from said voltage supplying means to said Q-phase windings, and
switching control means for comparing said current-detection signal with said command signal, producing said switching pulse signal responding with the comparison result, and changing a timing of said switching pulse signal responding with detection of said detected pulse signal.

22. The motor in accordance with claim 19, wherein
said switching operation means controls the peak of the composed current from said voltage supplying means to said Q-phase windings responding with said command signal.

23. The motor in accordance with claim 19, wherein
voltage detecting means produces said detected pulse signal responding with comparison result of the terminal voltages of said Q-phase windings.

24. The motor in accordance with claim 19, wherein
said activation operation means comprises:
state shifting means for shifting a holding state from one state to at least one other state in sequence responding with said detected pulse signal of said voltage detecting means;

activation control means for controlling the active periods of said Q first power transistors and said Q second power transistors responding with said holding state.

25. The motor in accordance with claim 24, wherein said state shifting means shifts said holding state from a first state to a second state after a first adjust time from detection of said detected pulse signal, and further shifts said holding state from the second state to a third state after a second adjust time from detection of said detected pulse signal, said second adjust time being larger than said first adjust time.

26. The motor in accordance with the claim 25, wherein said state shifting means produces said first adjust time and said second adjust time which are substantially proportional to an interval of said detected pulse signal.

27. The motor in accordance with claim 19, wherein said commanding means produces said command signal responding with an output pulse signal of said voltage detecting means.

28. A motor comprising:

a rotor having a field part which generates field fluxes;

Q-phase windings (Q is an integer of 3 or more);

voltage supplying means, including two output terminals, for supplying a DC voltage;

power supplying means having Q first power transistors and Q second power transistors, each of said Q first power transistors forming a current path between one output terminal side of said voltage supplying means and one of said Q-phase windings, and each of said Q second power transistors forming a current path between the other output terminal side of said voltage supplying means and one of said Q-phase windings;

voltage detecting means for producing a detected pulse signal responding with terminal voltages of said Q-phase windings, for producing a speed pulse signal which corresponds to a rotational speed of said disk and for producing a detection informing signal at an edge of the detected pulse signal;

activation operation means for controlling active periods of said Q first power transistors and said Q second power transistors responding with said detected pulse signal of said voltage detecting means, each of said active periods being an electrical angle which is larger than 360/Q degrees;

commanding means for producing a command signal responding with said speed pulse signal; and switching operation means including:
  current detecting means for producing a current-detection signal responding with or corresponding to a composed supply current from said voltage supplying means to said Q-phase windings, and
  switching control means for producing a switching pulse signal responding with said current detection signal and said command signal, causing at least one power transistor among said Q first power transistors and said Q second power transistors to perform high-frequency switching responding with said switching pulse signal so that the rotational speed of said rotor is controlled responding with said speed pulse signal, and changing a timing of said switching pulse signal responding with each occurrence timing of detection of said detection informing signal.

29. The motor in accordance with claim 28, wherein said switching operation means causes one or two of Q first power transistors to perform high-frequency switching simultaneously responding with said switching pulse signal.

30. The motor in accordance with claim 28, wherein said activation operation means comprises:
  state shifting means for shifting a holding state from one state to at least one other state in sequence responding with said detected pulse signal of said voltage detecting means;
  activation control means for controlling the active periods of said Q first power transistors and said Q second power transistors responding with said holding state.

31. A motor comprising: power transistors for forming current paths to plural-phase windings so as to rotate a rotor; voltage detecting means for producing a detected pulse signal responding with terminal voltages of said plural-phase windings and for producing a speed pulse signal which corresponds to a rotational speed of said disk and a detection informing signal at an edge of the detected pulse signal; activation operation means for controlling active periods of said power transistors responding with said detected pulse signal; and switching operation means for producing a switching pulse signal corresponding to a command signal which responds with said speed pulse signal, causing at least one power transistor of said power transistors to perform high-frequency switching responding with said switching pulse signal so that the rotational speed of said rotor is controlled responding with said speed pulse signal, and changing a timing of said switching pulse signal responding with each occurrence timing of detection of said detection informing signal.

32. The motor in accordance with claim 31, wherein said switching operation means comprises:
  current detecting means for producing a current-detection signal responding with or corresponding to a composed supply current to said plural-phase windings, and
  switching control means for comparing said current-detection signal with said command signal, producing said switching pulse signal responding with the comparison result, and changing a timing of said switching pulse signal responding with detection of said detected pulse signal.

33. The motor in accordance with claim 31, wherein said switching operation means controls the peak of the composed current to said plural-phase windings responding with said command signal.

34. The motor in accordance with claim 31, wherein voltage detecting means produces said detected pulse signal responding with comparison result of the terminal voltages of said plural-phase windings.

35. The motor in accordance with claim 31, wherein said activation operation means comprises:
  state shifting means for shifting a holding state from one state to at least one other state in sequence responding with said detected pulse signal of said voltage detecting means;
  activation control means for controlling the active periods of said power transistors responding with said holding state.

36. The motor in accordance with claim 35, wherein said state shifting means shifts said holding state from a first state to a second state after a first adjust time from detection of said detected pulse signal, and further shifts said holding state from the second state to a third state after a second adjust time from detection of said detected pulse signal, said first adjust time and said second adjust time being substantially proportional to an interval of said detected pulse signal.

* * * * *